United States Patent
Konishi et al.

(10) Patent No.: US 7,076,269 B2
(45) Date of Patent: Jul. 11, 2006

(54) RADIO COMMUNICATION SYSTEM FOR NOTIFYING INCOMMUNICABLE STATE, AND DEVICE AND METHOD USED FOR THE SYSTEM

(75) Inventors: Toshiyuki Konishi, Yamatokoriyama (JP); Atsushi Nakao, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 590 days.

(21) Appl. No.: 10/436,081

(22) Filed: May 13, 2003

(65) Prior Publication Data

US 2003/0220121 A1 Nov. 27, 2003

(30) Foreign Application Priority Data

May 13, 2002 (JP) ............................. 2002-136861

(51) Int. Cl.
*H04B 1/38* (2006.01)

(52) U.S. Cl. .................. 455/552.1; 455/41.2; 455/519

(58) Field of Classification Search ............. 455/552.1, 455/41.2, 41.3, 422, 500, 507, 41.1, 519, 455/411, 410, 517, 412.1
See application file for complete search history.

(56) References Cited

U.S. PATENT DOCUMENTS 6,304,755 B1  10/2001  Tiedemann, Jr. et al.
6,766,160 B1* 7/2004  Lemilainen et al. ........ 455/411
2001/0009853 A1  7/2001  Arimitsu
2003/0061503 A1* 3/2003  Katz et al. .................. 713/200
2003/0078002 A1* 4/2003  Sanjeev et al. ............... 455/41
2004/0203800 A1* 10/2004  Myhre et al. ............... 455/445
2005/0159136 A1* 7/2005  Rouse et al. ............. 455/412.1

FOREIGN PATENT DOCUMENTS

EP   1 146 692 A   10/2001
JP   5-102924 A    4/1993

* cited by examiner

*Primary Examiner*—Doris H. To
*Assistant Examiner*—Tan Trinh
(74) *Attorney, Agent, or Firm*—Birch Stewart Kolasch & Birch LLP

(57) ABSTRACT

A communication system includes: a server for transmitting a connection request to a cellular phone through a cellular phone network when receiving the connection request from a communication station to the cellular phone; the cellular phone for establishing a Bluetooth communication channel between the cellular phone and a hot spot computer located around the cellular phone in response to the connection request received from the server; and the hot spot computer for transmitting data received from the cellular phone to the server through a network via the Bluetooth communication channel so as to communicate the cellular phone with the communication station. When the communication channel between the cellular phone and the hot spot computer cannot be established, the cellular phone transmits information which represents a reason that the communication channel cannot be established, to the communication station through the server.

28 Claims, 26 Drawing Sheets

F I G. 4
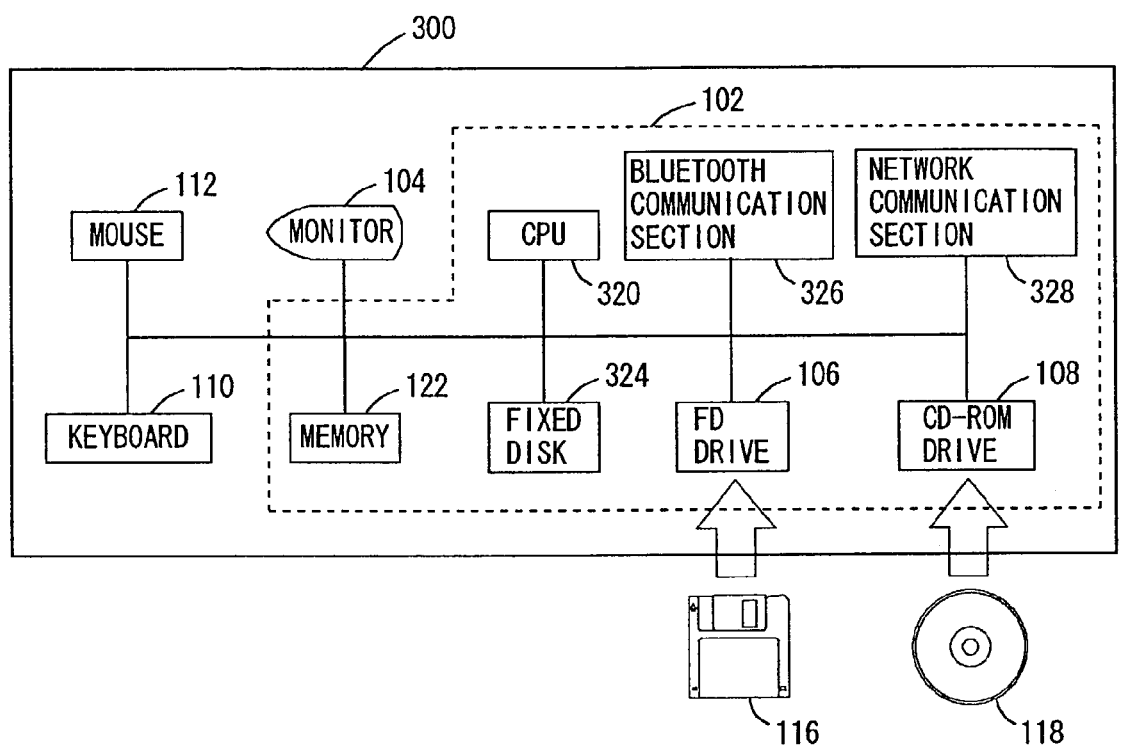

FIG. 11

| CELLULAR PHONE CONNECTION INFORMATION | HOT SPOT COMPUTER CONNECTION INFORMATION | DISCONNECT TIME |
|---|---|---|
| K(1) | H(1) | 16:40 |
| K(2) | H(2) | 17:20 |
| K(3) | H(3) | 17:50 |
| ... | ... | ... |

| WARNING INFORMATION ACQUISITION KEYWORD | DETAILED INFORMATION ON PERIPHERY OF HOT SPOT COMPUTER |
|---|---|
| EARTHQUAKE OCCURS | SEEK REFUGE IN XXXX GYMNASIUM |
| FLOOD OCCURS | SEEK REFUGE IN XXXX ELEMENTARY SCHOOL |
| ... | ... |

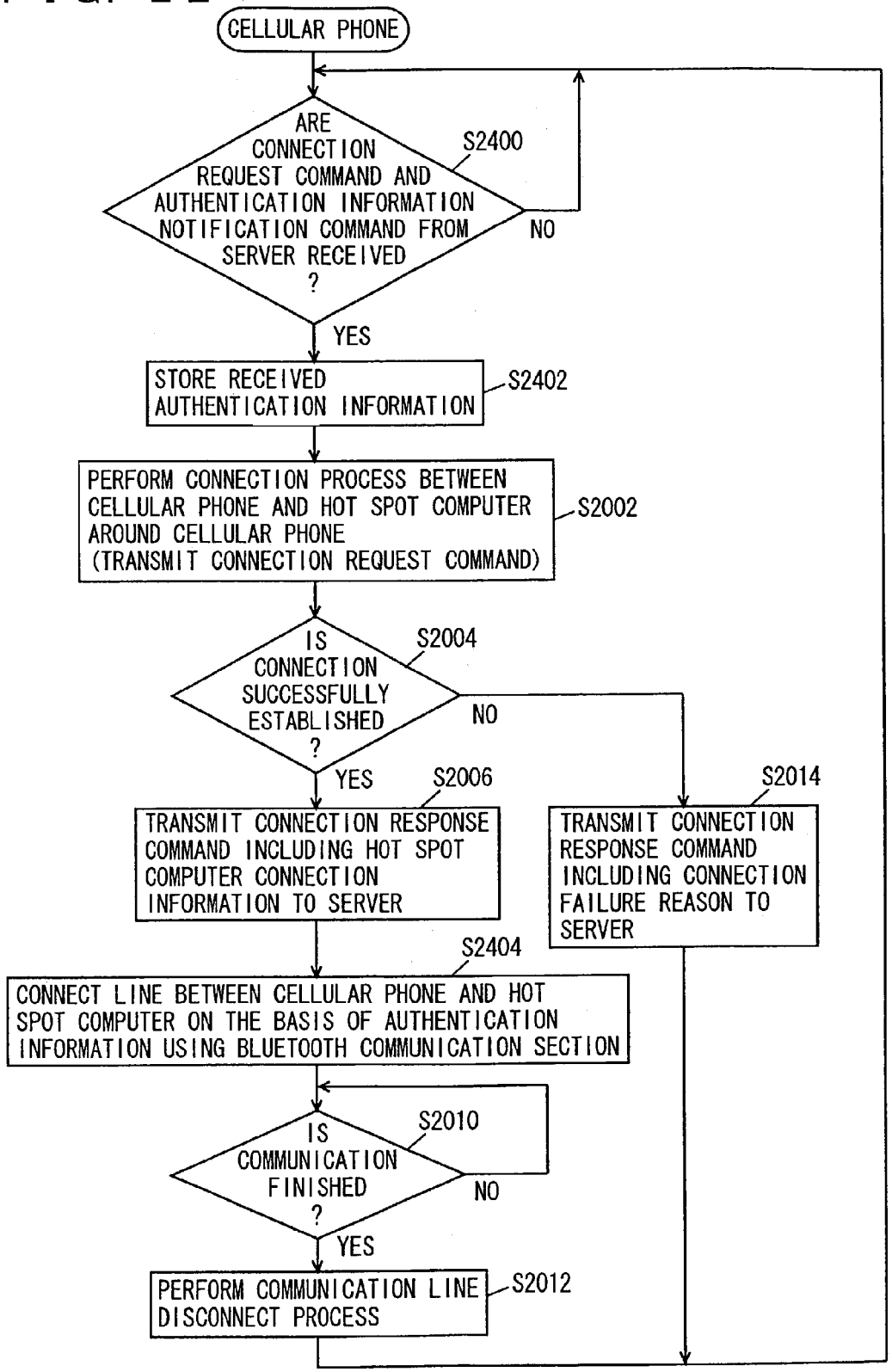

F I G. 2 3
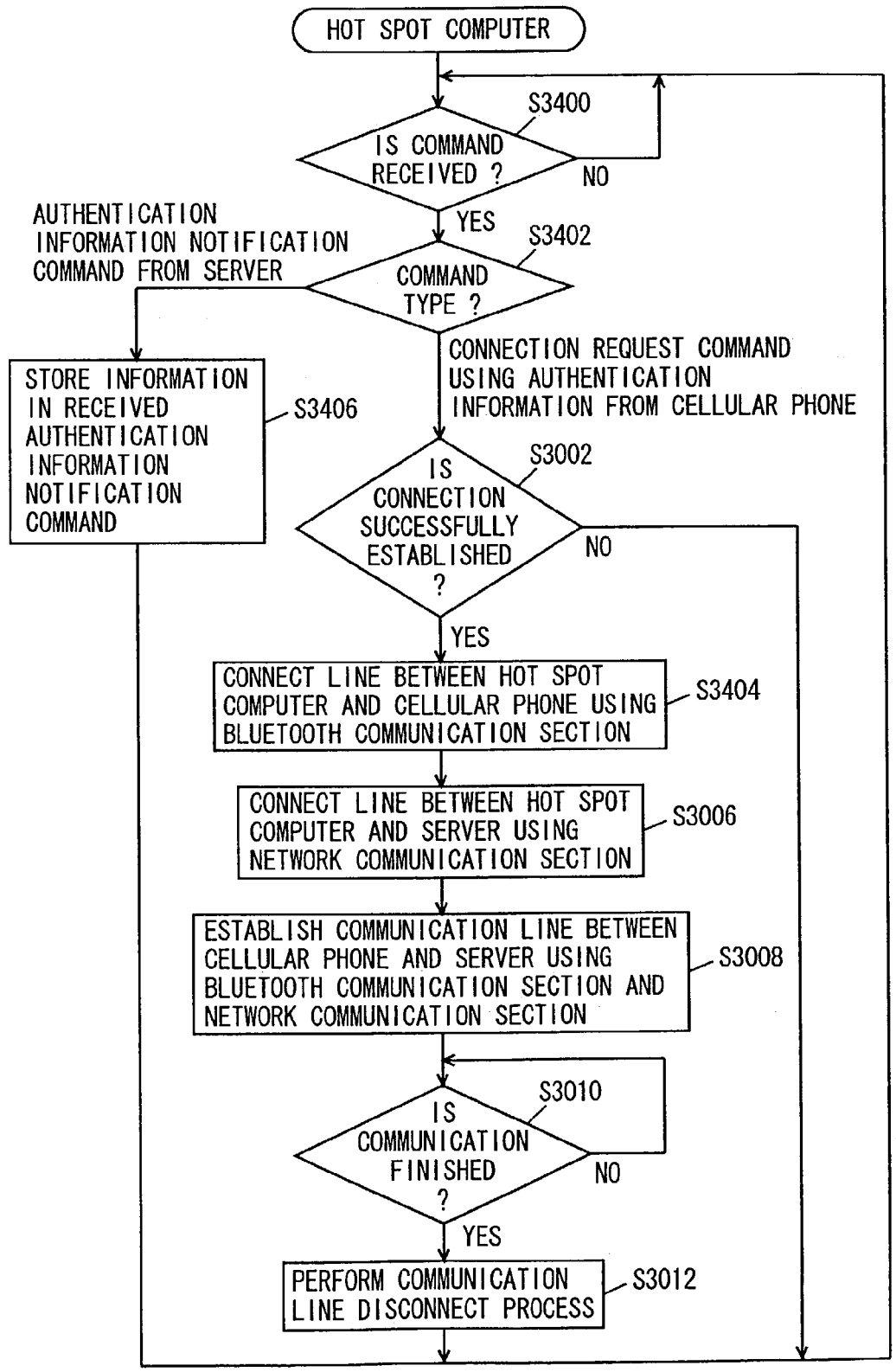

FIG. 26

```
AUTHENTICATION INFORMATION CREATION REQUEST COMMAND,
SERVER → HOT SPOT COMPUTER

┌─────────────────────────────┐
│ AUTHENTICATION INFORMATION  │
│ CREATION REQUEST HEADER     │
└─────────────────────────────┘
```

RADIO COMMUNICATION SYSTEM FOR NOTIFYING INCOMMUNICABLE STATE, AND DEVICE AND METHOD USED FOR THE SYSTEM

BACKGROUND OF THE INVENTION

1. Field of the Invention

The present invention relates to a radio communication system for connecting a communication station to a cellular phone in response to a connection request from the communication station and, more particularly, to a communication technique of a radio communication system including: a server performing a connection request process to a cellular phone in response to a connection request from a communication station; and a communication device connected to a server to communicate with a cellular phone.

2. Description of the Background Art

In a system utilizing radio communication, differently in situation from that utilizing wire communication, communication with a radio base station cannot be always established, depending on whether a cellular phone exists in a range where radio waves from a radio base station reaches, whether a cellular phone is in a wait state or the like. Therefore, even when a connection request is transmitted from the communication station, the cellular phone cannot receive the request and cannot establish the connection with the communication station.

Japanese Patent Laying-Open No. 5-102924 discloses a cellular phone which switches over two types of communication circuits and responds to a call transmitted from a master station. The cellular phone disclosed therein includes: a circuit forming a radio channel (main line) with a radio base station; a call reception circuit receiving a call originating from a master station and transmitted from a radio transmission station in a wait state; and a circuit turning off a cellular phone main body when no communication channel is formed.

According to the cellular phone disclosed in this publication, while the cellular phone is in a wait state, only the radio call reception circuit is turned on, the cellular phone main body is turned off, and the radio channel (main line) is turned off. The cellular phone main body is turned on only when the cellular phone responds to or communicates with the radio base station. With this structure, even when no radio channel is formed, the call reception circuit can detect a call transmitted from the radio transmission station. In addition, in the wait state, the cellular phone main body, i.e., the battery thereof is turned off, thereby making it possible to suppress power consumption from being wasted.

However, the radio call reception circuit of the cellular phone disclosed in this publication deals only with reception. Therefore, when the main circuit is turned off and the system is unusable, the detailed state of the cellular phone (in which the cellular phone is out of the range of the radio base station, the cellular phone is turned off, there is no empty communication channel of the radio base station for the cellular phone, the cellular phone is holding a communication, the cellular phone is out of order or the like) is not notified to the master station. As a result, an originator is disadvantageously incapable of knowing the reason why the communication cannot be established.

Furthermore, even when the main line is usable, the following disadvantages arises due to the fact that the radio call reception circuit deals only with reception. In establishing communication between the cellular phone and the radio base station, authentication information and connection information common to the cellular phone and the radio base station are required. However, since these pieces of information cannot be instantly shared between the cellular phone and the radio base station, it is necessary to register the information in advance.

SUMMARY OF THE INVENTION

It is an object of the present invention to provide a radio communication system which enables an originator to know the reason on the part of a receiving end that radio communication cannot be established, and a device used for the system.

It is another object of the present invention to provide a radio communication system capable of widening a radio communication reception range, and a device used for the system.

It is still another object of the present invention to provide a radio communication system capable of easily executing an authentication process with high security, and a device used for the system.

It is yet another object of the present invention to provide a radio communication system capable of executing an authentication process with high security without preparing authentication information in advance, and a device used for the system.

A radio communication system according to the present invention includes: a plurality of first communication devices; a second communication device; and a portable terminal holding radio communication with one of the first communication devices and the second communication device. The second communication device includes: a first communication section for communicating with the first communication device; a second communication section for communicating with the portable terminal; and a third communication section for communicating with the communication device other than the one communication device communicating with the first communication section; and a control section for controlling the first communication section, the second communication section, and the third communication section. The control section includes: a section for controlling the third communication section so as to receive a connection request to the portable terminal from the other communication device; and a section for controlling the second communication section so as to transmit the connection request to the portable terminal. The portable terminal includes: a first communication section for communicating with the first communication device; a second communication section for communicating with the second communication device; a search section for searching for the communicable first communication device from the plurality of first communication devices; and a control section for controlling the first communication section and the second communication section. The control section includes a section for controlling the first communication section and the second communication section so as to selectively execute one of a first communication mode for communicating with the other communication device via the second communication device and a second communication mode for communicating with the other communication device via the communicable first communication device and the second communication device, on the basis of a search result of the search section. The first communication device includes: a first communication section for communicating with the portable terminal; a second communication section for communicating with the second communication device; and a control section for controlling the first communication section and the second communication section. The control section includes: a section for controlling the first communication section so as to transmit information which represents that communication can be held, to the portable terminal in response to the search result of the search section; and a section for controlling the first communication section and the second communication section so as to hold communication between the portable terminal and the second communication device when the second communication mode is selected. The control section of the portable terminal further includes a section for controlling the first communication section and the second communication section so as to hold communication between the first communication device and the second communication device when the second communication mode is selected. The control section of the second communication section further includes: a section for controlling the second communication section and the third communication section so as to hold communication between the portable terminal and the other communication device when the first communication mode is selected; and a section for controlling the first communication section and the third communication section so as to hold communication between the first communication section and the other communication device when the second communication mode is selected.

The second communication device that receives a connection request from the other device to the portable terminal transmits the connection request to the portable terminal. When the portable terminal receives the connection request from the second communication device, the first communication device existing around the portable terminal is searched. At this time, the communication between the portable terminal and the first communication device is held over short-distance radio communication such as, for example, Bluetooth communication. For example, the first communication mode in which the first communication device cannot be searched and the second communication mode in which the first communication device can be searched are set. In the first communication mode, the reason that the first communication device cannot be searched (e.g., the state of the portable terminal or the search result of searching for the first communication device) is transmitted to the other communication device via the second communication device. As a result, the user of the other communication device can recognize the reason that the portable terminal cannot be connected to the other communication device via the first communication device. In the second communication mode, the portable terminal can communicate with the other communication device via the first communication device and the second communication device. As a result, even when the second communication device is out of the range of the first communication device, the second communication device notifies reception by the wide-range radio network of the portable terminal, so that the reception area of the portable terminal can be widened. When the portable terminal and the first communication device cannot communicate with each other over radio, the portable terminal notifies the second communication device that the portable terminal and the first communication device cannot communicate with each other over the wide-range radio network, the other device is notified of detailed information on the portable terminal, the reason that communication cannot be held becomes clear, and it is thereby possible to prevent a connection request from being issued again. As a result, an originator can know the reason on-the part of the receiving end that radio communication cannot be held.

It is preferable that the control section of the portable terminal includes a section for controlling the first communication section and the second communication section so as to selectively execute the second communication mode in response to the search result of the search section that the communicable first communication device is searched.

When the portable terminal cannot search for the first communication device, the first communication mode is executed, thus making it possible to transmit necessary information from the portable terminal to the second communication device.

It is more preferable that the control section of the portable terminal includes a section for controlling the first communication section and the second communication section so as to selectively execute the first communication mode in response to the search result of the search section that the communicable first communication section is not searched.

When the portable terminal can search for the first communication device, the second communication mode is executed, thus making it possible to establish a communication channel between the portable terminal and the other device via the first communication device and the second communication device.

It is further preferable that the control section of the portable terminal further includes a section for controlling the second communication section so as to execute the first communication section, and to transmit information which represents a reason that the communicable first communication device is not searched by the search section to the second communication device. The control section of the second communication device may further include a section for controlling the third communication section so as to transmit the information representing the reason to the other communication device.

When the portable terminal cannot search for the first communication device, information which represents the reason that the first communication device cannot be searched can be transmitted to the other communication device via the second communication device.

Further, it is preferable that the second communication device further includes a storage section for storing a communication history of the communication between the portable terminal and the first communication device. The control section of the second communication device may further include a section for controlling the first communication section so as to communicate with the first communication device included in the communication history stored in the storage section on the basis of the communication history.

The storage section provided in the second communication section stores the communication history of the communication between the portable terminal and the first communication device. The second communication device communicates with the first communication device which has a history of already establishing the communication line. Thus, since the second communication device stores the communication history of the communication between the portable terminal and the first communication device, it is possible to directly connect the first communication device to the portable terminal without to notify the connection request to the portable terminal using the wide-range communication network of the portable terminal by comparing the connection request from the other communication device with the communication history.

More preferably, the first communication device further includes a storage section for storing a keyword and information corresponding to the keyword. The control section of the second communication device further includes a section for controlling the second communication section so as to transmit the keyword to the portable terminal. The control section of the cellular phone further includes a section for controlling the first communication section so as to transmit the keyword received from the second communication device to one of the first communication device. The first communication device further includes a read section for reading the information corresponding to the received keyword from the storage section in response to reception of the keyword from the portable terminal. The control section of the first communication device further includes a section for controlling the first communication section so as to transmit the corresponding information to the portable terminal.

On the basis of the keyword transmitted from the second communication device to the portable terminal, the information corresponding to the keyword stored in the first communication device is transmitted to the portable terminal. Regional information corresponding to the location where the first communication device is installed is stored in the first communication device. When it is necessary to acquire detailed information on the region where the cellular phone is currently present, only the keyword is acquired from the server and transmitted to the hot spot computer around the portable terminal, whereby it is possible to acquire the detailed information on the periphery of the portable terminal on the basis of the keyword.

More preferably, authentication for connection between the portable terminal and the first communication device is made using authentication information. The second communication device further includes a creation section for creating the authentication information. The control section of the second communication device further includes: a section for controlling the first communication section so as to transmit the authentication information to the first communication device; and a section for controlling the second communication section so as to transmit the authentication information to the portable terminal. The control section of the portable terminal further includes a section for controlling the first communication section so as to communicate with the first communication device on the basis of the authentication information received from the second communication device. The control section of the first communication device further includes a section for controlling the first communication section so as to communicate with the portable terminal on the basis of the authentication information received from the second communication section.

The creation section of the second communication device creates authentication information. This authentication information is, for example, a PIN (Personal Identification Number) code used when connecting the portable terminal to the first communication device. The second communication device transmits the created authentication information to the first communication device and the portable terminal. The control section of the portable terminal authenticates the connection between the portable terminal and the first communication device on the basis of the authentication information received from the second communication device, and the control section of the first communication device authenticates the connection between the portable terminal and the first communication device on the basis of the authentication information received from the second communication device. Thus, common authentication information is created by the second communication device and shared between the portable terminal and the first communication device. Due to this, it is unnecessary to store common authentication information in both the portable terminal and the first communication device in advance, and it is thereby possible to determine the authentication information according to various situations and to improve communication privacy. As a result, it is possible to provide the radio communication system which can easily execute an authentication process with high security without preparing the authentication information in advance.

It is further preferable that authentication for connection between the portable terminal and the first communication device is made using authentication information. The portable terminal further includes a creation section for creating the authentication information. The control section of the portable terminal further includes a section for controlling the second communication section so as to transmit the authentication information to the second communication device. The control section of the second communication device further includes a section for controlling the first communication section so as to transmit the authentication information to the first communication device. The control section of the portable terminal further includes a section for controlling the first communication section so as to communicate with the first communication device on the basis, of the authentication information created by the creation section. The control section of the first communication devices further includes a section for controlling the first communication section so as to communicate with the portable terminal on the basis of the authentication information received from the second communication device.

The creation section of the portable terminal creates authentication information. The second communication device transmits the created authentication information to the first communication device. The control section of the portable terminal authenticates the connection between the portable terminal and the first communication device on the basis of the authentication information created by the creation section, and the control section of the first communication device authenticates the connection between the portable terminal and the first communication device on the basis of the authentication information received from the second communication device. Thus, common authentication information is created by the second communication device and shared between the portable terminal and the first communication device. With this structure, it is unnecessary to store common authentication information in both the portable terminal and the first communication device in advance, and it is thereby possible to determine the authentication information according to various situations and to improve communication privacy. As a result, it is possible to provide the radio communication system which can easily execute an authentication process with high security without preparing the authentication information in advance.

It is more preferable that authentication for; connection between the portable terminal and the first communication device is made using authentication information. The first communication device further includes a creation section for creating the authentication information. The control section of the one fist communication device further includes a section for controlling the second communication section so as to transmit the authentication information to the second communication device. The control section of the second communication device further includes a section for controlling the second communication section so as to transmit the authentication information to the portable terminal. The control section of the portable terminal further includes a section for controlling the first communication section so as to communicate with the first communication device on the basis of the authentication information received from the second communication device. The control section of the first communication device further includes a section for controlling the first communication section so as to communicate with the portable terminal on the basis of the authentication information created by the creation section.

The creation section of the first communication device creates authentication information. The second communication device transmits the created authentication information to the portable terminal. The control section of the portable terminal authenticates the connection between the portable terminal and the first communication device on the basis of the authentication information received from the second communication device, and the control section of the first communication device authenticates the connection between the portable terminal and the first communication device on the basis of the authentication information created by the creation section. Thus, common authentication information is created by the second communication device and shared between the portable terminal and the first communication device. With this structure, it is unnecessary to store common authentication information in both the portable terminal and the first communication device in advance, and it is thereby possible to determine the authentication information according to various situations and to improve communication privacy. As a result, it is possible to provide the radio communication system which can easily execute an authentication process with high security without preparing the authentication information in advance.

More preferably, the portable terminal further includes a switch section for switching a state of the first communication section to an operating state when the first communication section is in a non-operating state, in response to reception of the connection request from the second communication device.

When the communication section of the portable terminal for communicating with the first communication device, for example, the Bluetooth communication section is in a non-operating state, the power of the Bluetooth communication section is turned on to turn the Bluetooth communication section into an operating state. It is thereby possible to consume power only when it is necessary to activate the Bluetooth communication section.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a control block diagram for a hot spot computer of the radio communication system shown in FIG. 1;

FIG. 11 is a communication history table stored in a server of a radio communication system according to a second embodiment of the present invention;

FIG. 22 is a flow chart for a process executed by a cellular phone of the radio communication system according to the fourth embodiment of the present invention;

FIG. 23 is a flow chart for a process executed by a hot spot computer of the radio communication system according to the fourth embodiment of the present invention;

FIG. 26 represents an authentication information creation request command according to a sixth embodiment of the present invention;

DESCRIPTION OF THE PREFERRED EMBODIMENTS

Hereinafter, embodiments of the present invention will be described with reference to the drawings. The same constituent elements are respectively denoted by the same reference symbols and are equal in name and function. Therefore, they will not be repeatedly described in detail.

First Embodiment

Figure 1:
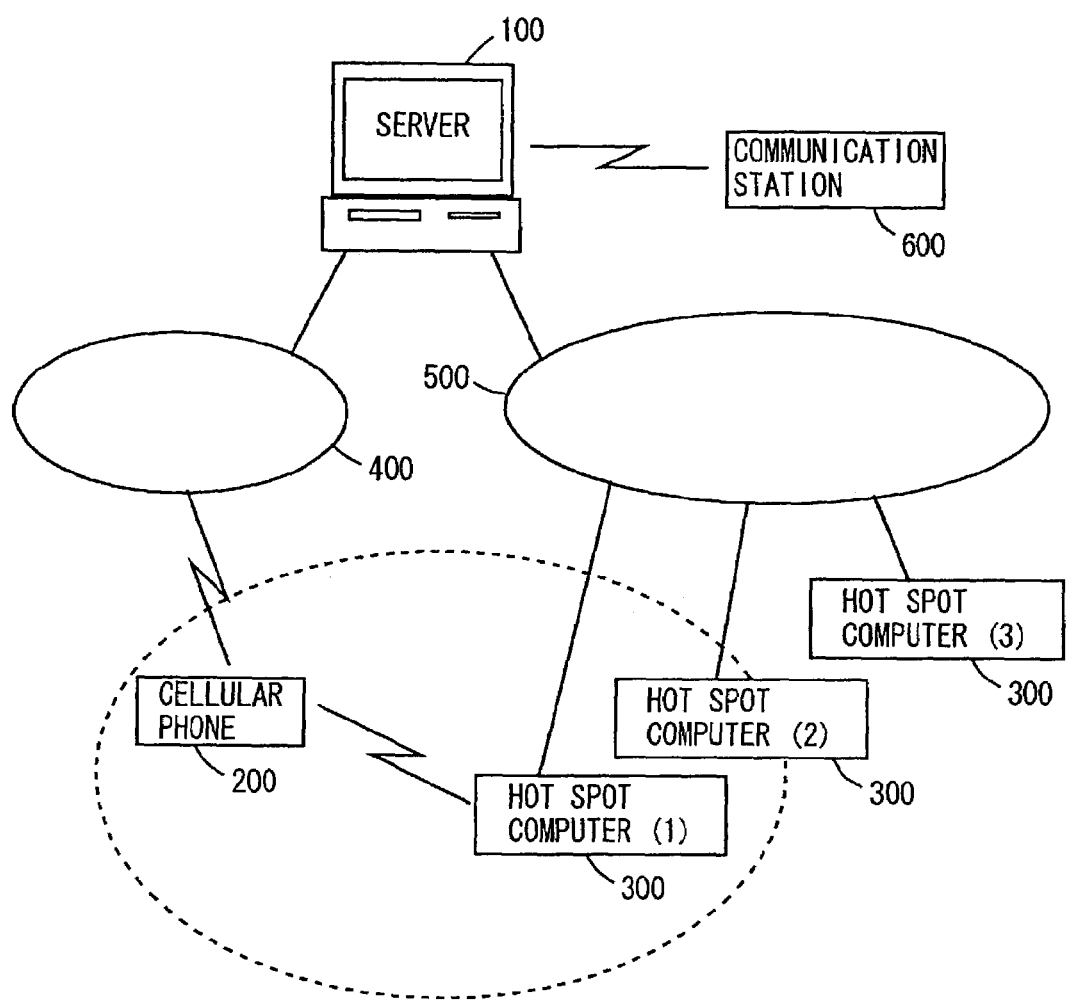
FIG. 1 shows the configuration of a radio communication system according to a first embodiment of the present invention.

Referring to FIG. 1, description will be given of the overall configuration of a radio communication system according to a first embodiment of the present invention. It is noted that description will be given of a cellular phone as a mobile terminal, a hot spot computer, which is located at a hot spot (also referred to as an access point) in a town, as a first communication device, and a server, which is connected to the cellular phone over a cellular phone system, as a second communication device.

As shown in FIG. 1, this system includes: a hot spot computer 300 located in a town; a cellular phone 200 holding short-distance radio communication with hot spot computer 300; and a server 100 connected to cellular phone 200 over a cellular phone network 400. Data communication between server 100 and cellular phone 200 is realized through cellular phone network 400. Data communication between server 100 and hot spot computer 300 is realized through a network 500. When receiving a connection request from a communication station 600, server 100 is connected to cellular phone 200. Data communication is established between cellular phone 200 and hot spot computer 300 through short-distance radio communication called "Bluetooth".

In this radio communication system, when server 100 receives a connection request from communication station 600, a connection request command is transmitted through cellular phone network 400 to cellular phone 200. When cellular phone 200 is in a communicable state, cellular phone 200 is connected to hot spot computer 300 over the short-distance radio communication called Bluetooth, and hot computer 300 is connected to server 100 over network 500 to thereby connect cellular phone 200 to communication station 600. In this case, when cellular phone 200 is in a incommunicable state, a reason that cellular phone 200 is incommunicable is transmitted to communication station 600 through cellular phone network 400 and server 100.

Figure 2:
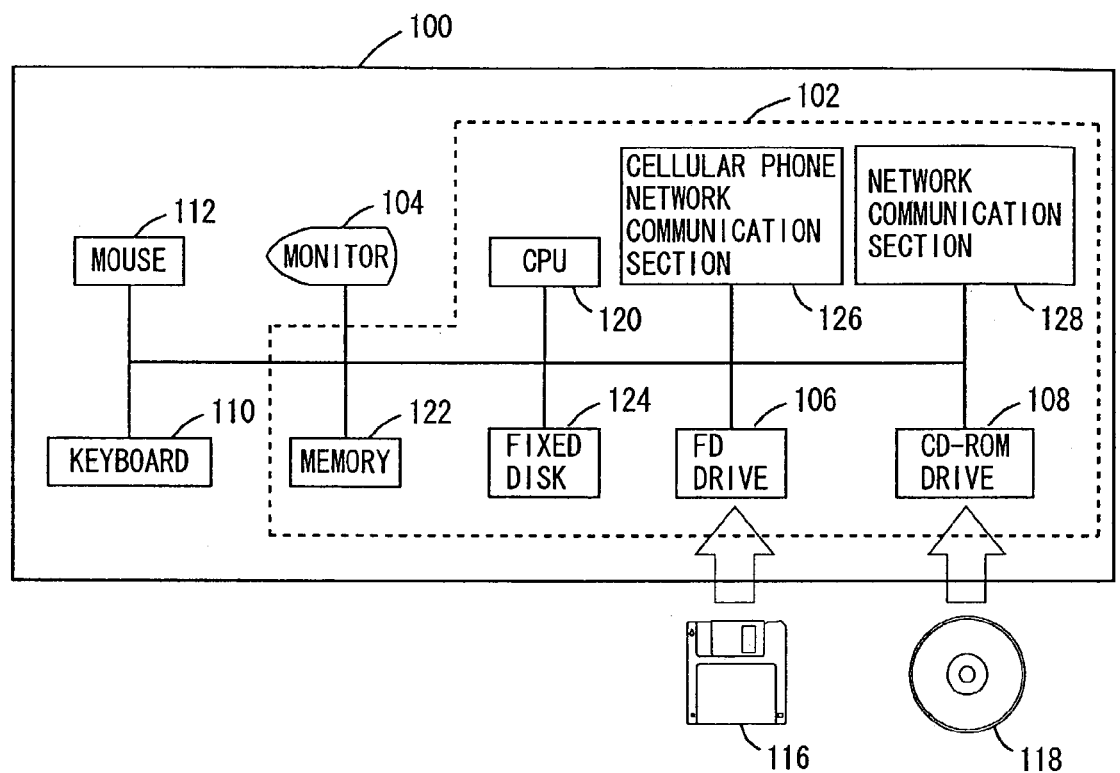
FIG. 2 is a control block diagram for a server of the radio communication system shown in FIG. 1.

FIG. 2 shows the control blocks of a computer system as one example of server 100. Referring to FIG. 2, computer system 100 includes a computer 102 provided with an FD (Flexible Disk) drive 106 and a CD-ROM (Compact Disc-Read Only Memory) drive 108, a monitor 104, a keyboard 110, and a mouse 112. Computer 102 is further provided with, in addition to FD drive 106 and CD-ROM drive 108, a CPU (Central Processing Unit) 120, a memory 122, a fixed disk 124, a cellular phone network communication section 126 for communication with cellular phone 200 through cellular phone network 400, and a network communication section 128 for connection with hot spot computer 300 through network 500. These constituent elements of computer 102 are connected to one another by a bus. An FD 116 is installed in FD drive 106. A CD-ROM 118 is installed in CD-ROM drive 108.

A process performed by server 100 is realized by software executed by a computer hardware and CPU 120. Normally, this software is stored in a recording medium such as FD 116 or CD-ROM 118, distributed, read from the recording medium by FD drive 106, CD-ROM drive 108 or the like, and temporarily stored in fixed disk 124. Further, the software is read from fixed disk 124 to memory 122, and executed by CPU 120. The hardware of computer 102 shown in FIG. 2 is ordinary hardware. Therefore, the most essential part of the present invention is the software recorded on the recording mediums such as FD 116, CD-ROM 118, and fixed disk 124.

Since the operation of computer 102 shown in FIG. 2 is well known, it will not be repeatedly described herein in detail.

Figure 3:
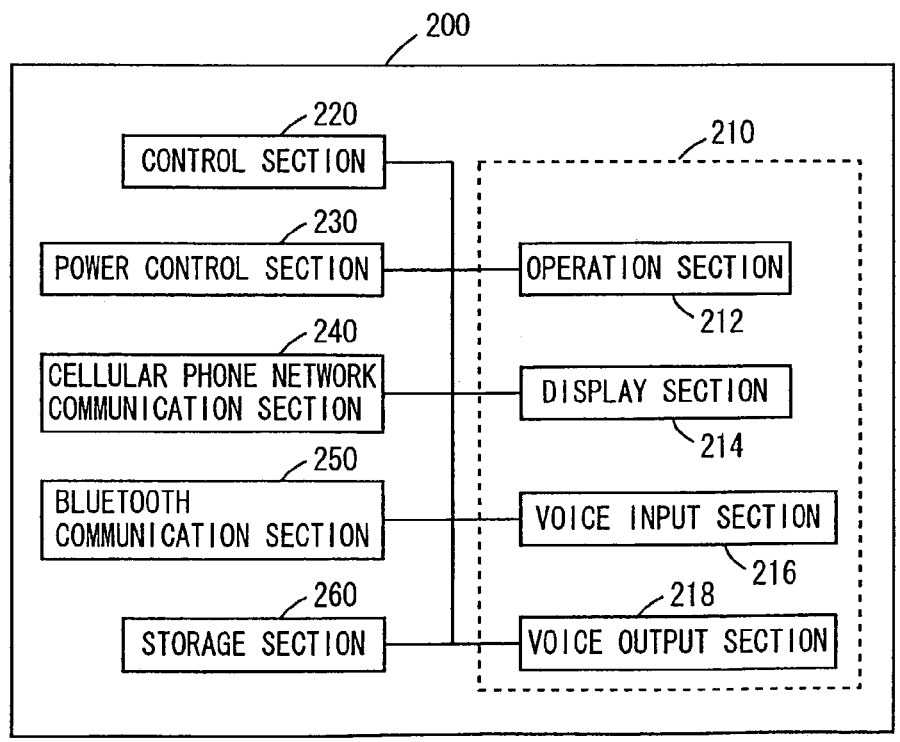
FIG. 3 is a control block diagram for a cellular phone of the radio communication system shown in FIG. 1.

FIG. 3 shows the control blocks of cellular phone 200 in this embodiment. Referring to FIG. 3, cellular phone 200 includes an input/output section 210 which serves as an interface with a user, a control section 220 which controls overall cellular phone 200, a power control section 230 which controls a power supply, a cellular phone communication section 240 for communication with server 100, a Bluetooth communication section 250 for communication with hot spot computer 300, and a storage section 260 which stores a program executed by control section 220, intermediate data on the program, and data received from other devices. Input/output section 210 includes an operation section 212 which enables the user of cellular phone 200 to input the telephone numbers of other telephone devices, a display section 214 which consists of an LCD (Liquid Crystal Display) for displaying information to the user, a voice input section 216 which consists of a microphone that inputs voice, and a voice output section 218 which consists of a speaker that outputs the voice.

Similarly to server 100, a process performed by cellular phone 200 in this embodiment is realized by the software executed by the hardware and control section 220 of cellular phone 200. The hardware itself of cellular phone 200 shown in FIG. 3 is ordinary hardware. The most essential part of the present invention is software recorded on storage section 260 or the like.

Since the operation of cellular phone 200 shown in FIG. 3 is also well known, it will not be described herein in detail.

FIG. 4 shows the control blocks of a computer system as one example of hot spot computer 300. Referring to FIG. 4, computer system 300 includes: a CPU 320 for executing a program different from the program for server 100 described above with reference to FIG. 2; a fixed disk 324 for storing different information from that for server 100, a Bluetooth communication section 326 for short-distance radio communication with cellular phone 200, and a network communication section 328 for connection with hot spot computer 300 through network 500.

Similarly to server 100, a process performed by hot spot computer 300 is realized by the software executed by the hardware and CPU 320 of computer system 300. The hardware itself of the computer shown in FIG. 4 is ordinary one. The most essential part of the present invention is software recorded on recording mediums such as FD 116, CD-ROM 118 and fixed disk 324.

Since the operation of the computer shown in FIG. 4 is well known, it will not be repeatedly described herein in detail.

Figure 5:
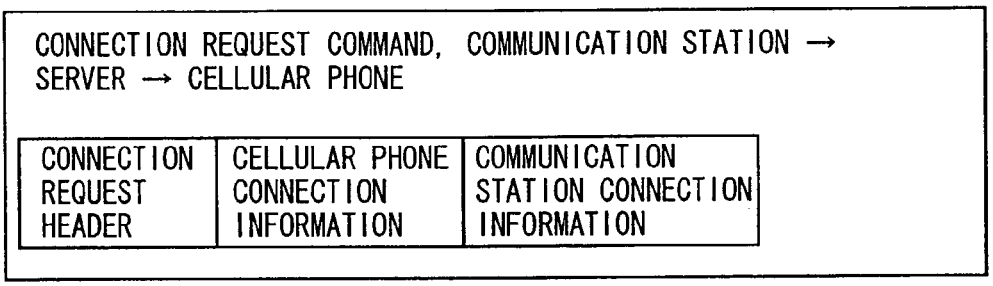
FIG. 5 represents a connection request command according to the first embodiment of the present invention.

Referring to FIG. 5, description will be given of the connection request command transmitted from communication station 600 to server 100 and cellular phone 200 in this embodiment. As shown in FIG. 5, the connection request command includes a connection request header, connection information on cellular phone 200, and connection information on communication station 600.

Figure 6:
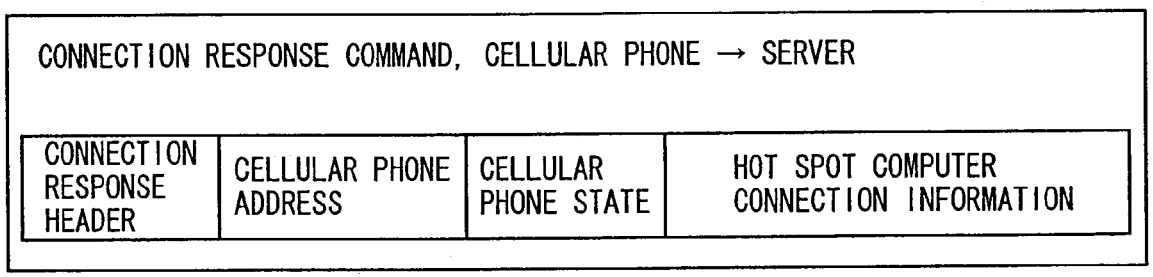
FIG. 6 represents a connection response command according to the first embodiment of the present invention.

Referring to FIG. 6, description will be given of a connection response command transmitted from cellular phone 200 to server 100 in this embodiment. As shown in FIG. 6, the connection response command includes a connection response header, the address of cellular phone 200, the state of cellular phone 200, and connection information on host spot computer 300.

Figure 7:
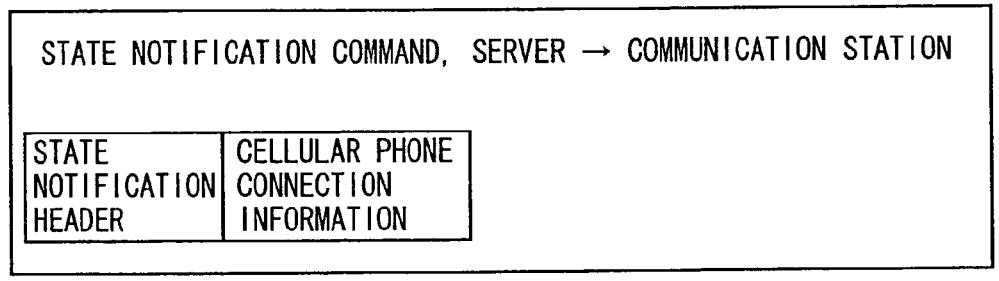
FIG. 7 represents a state notification command according to the first embodiment of the present invention.

Referring to FIG. 7, description will be given of a state notification command transmitted from server 100 to communication station 600 in this embodiment. As shown in FIG. 7, the state notification command includes a state notification header and connection information on cellular phone 200.

Figure 8:
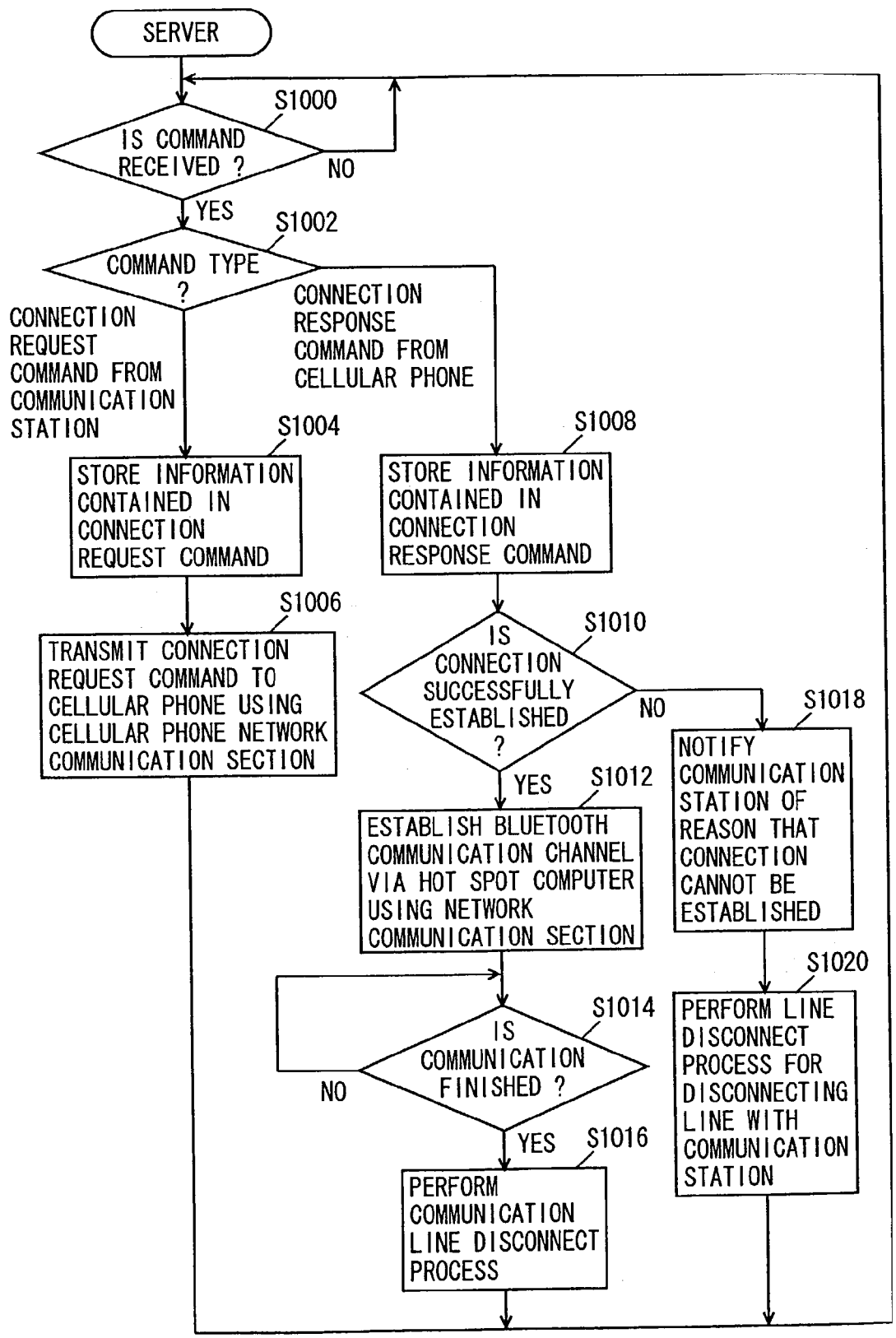
FIG. 8 is a flow chart for a process executed by the server of the radio communication system according to the first embodiment of the present invention.

Referring to FIG. 8, description will be given of a control structure for a program executed by server 100 of the radio communication system in this embodiment.

In a step (to be abbreviated as "S" hereinafter) 1000, CPU 120 of server 100 determines whether or not a command is received. The determination is on the basis of whether or not cellular phone network communication section 126 or network communication section 128 receive a command. When the command is received ("YES" in S1000), the processing proceeds to S1002. If not ("NO" in S1000), the processing returns to S1000 to wait for the reception of a command.

In S1002, CPU 120 determines the type of the command. When the command received is a connection request command from communication station 600, the processing proceeds to S1004. When the received command is a connection response command from cellular phone 200, the processing proceeds to S1008.

In S 1004, CPU 120 stores information contained in the connection request command. This connection request command is that shown in FIG. 5. In S1006, CPU 120 transmits the connection request command to cellular phone 200 using cellular phone network communication section 126. The processing is then returned to S1000.

In S1008, CPU 120 stores information contained in the connection response command. This connection response command is that shown in FIG. 6. In S1010, CPU 120 determines whether or not connection with hot spot computer 300 is successfully established. When connection is successful ("YES" in S1010), the processing proceeds to S1012. When connection fails ("NO" in S 1010), the processing proceeds to S1018.

In S1012, CPU 120 establishes a Bluetooth communication channel via hot spot computer 300 using network communication section 128.

In S 1014, CPU 120 determines whether or not communication is finished. This communication is the communication between cellular phone 200 and communication section 600 through hot spot computer 300 and server 100. When the communication is finished ("YES" in S1014), the processing proceeds to S 1016. When the communication is not finished ("NO" in S1014), the processing returns to S1014 to wait for the communication to be finished.

In S1016, CPU 120 performs a communication line disconnect process. Thereafter, the processing returns to S1000.

In S1018, CPU 120 notifies communication station 600 of a reason that connection cannot be established. In S1020, CPU 120 performs a line disconnect process for disconnecting a line with communication station 600. Thereafter, the processing returns to S1000.

Figure 9:
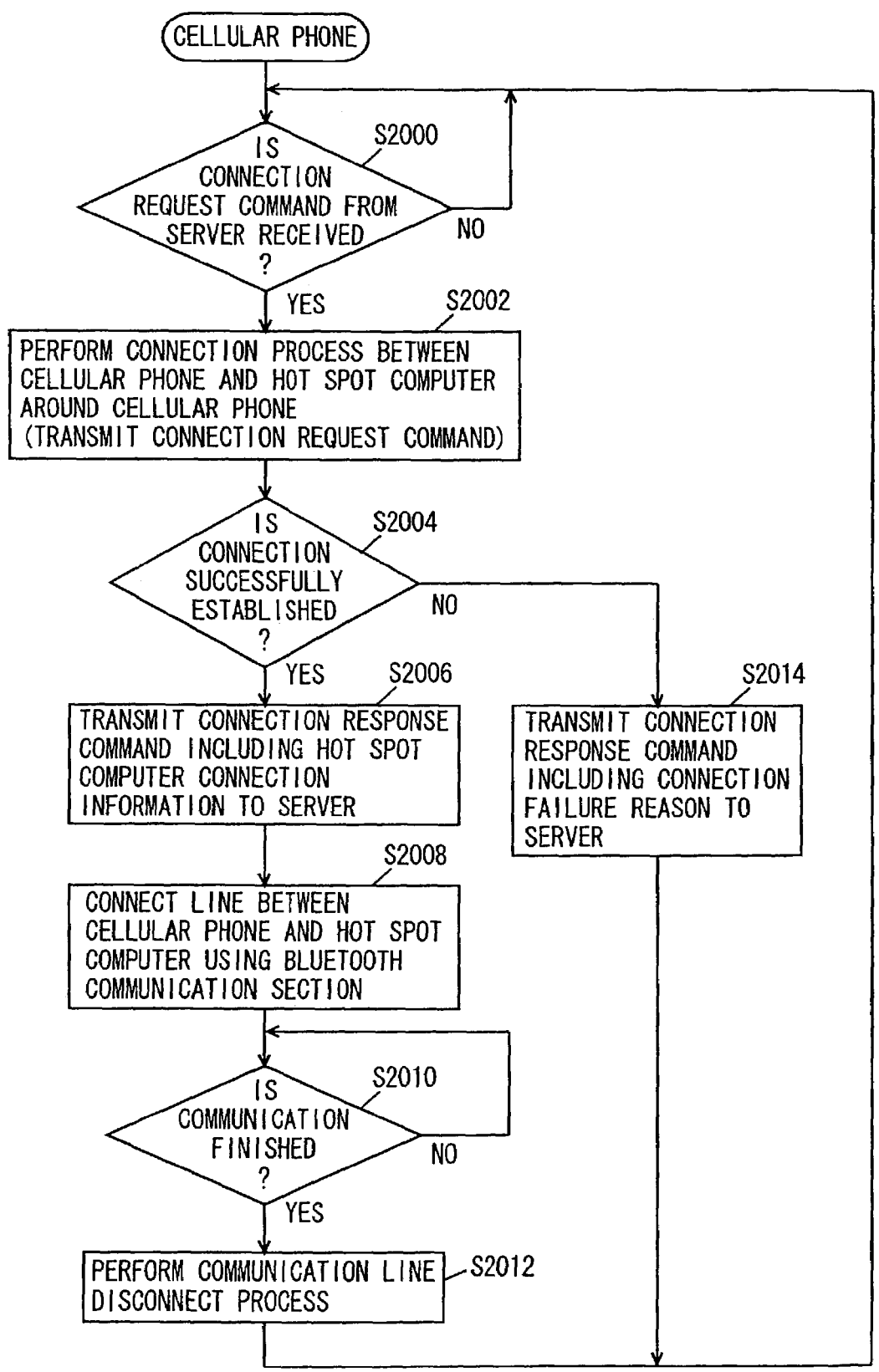
FIG. 9 is a flow chart for a process executed by the cellular phone of the radio communication system according to the first embodiment according to the present invention.

Referring to FIG. 9, description will be given of a control structure for a program executed by cellular phone 200 of the radio communication system in this embodiment. In S2000, control section 220 of cellular phone 200 determines whether or not a connection request command (FIG. 5) is received from server 100. When the connection request command from server 100 is received ("YES" in S2000), the processing proceeds to S2002. If not ("NO" in S2000), the processing returns to S2000 to wait for the reception of the connection request command from server 100.

In S2002, control section 220 performs a connection process for connection with hot spot computer 300 disposed around cellular phone 200. At this time, control section 220 transmits the connection request command to hot spot computer 300.

In S2004, control section 220 determines whether or not the connection between cellular phone 200 and hot spot computer 300 is successfully established. When the connection is successful ("YES" in S2004), the processing proceeds to S2006. When the connection fails ("NO" in S2004), the processing proceeds to S2014.

In S2006, control section 220 transmits the connection response command (FIG. 6) including connection information on hot spot computer 300 to server 100.

In S2008, control section 220 connects a line between cellular phone 200 and hot spot computer 300 using Bluetooth communication section 250.

In S2010, control section 220 determines whether or not communication is finished. When the communication is finished ("YES" in S2010), the processing proceeds to S2012. If not ("NO" in S2010), the processing returns to S2010 to wait for the communication to be finished.

In S2012, control section 220 performs a communication line disconnect process. Thereafter, the processing returns to S2000.

In S2014, control section 220 transmits the connection response command (FIG. 6) including a reason for the connection failure to server 100. Thereafter, the processing returns to S2000.

Figure 10:
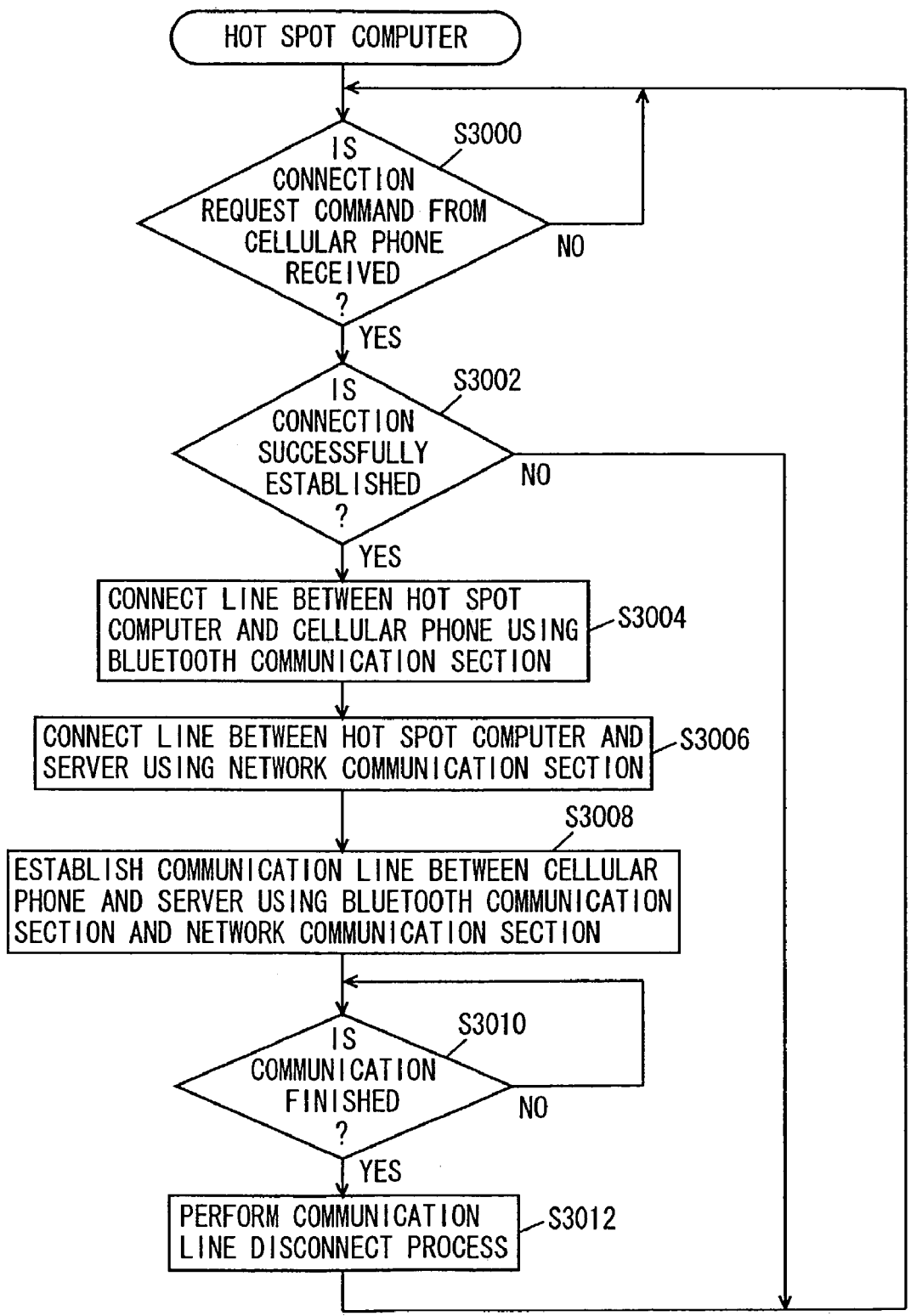
FIG. 10 is a flow chart for a process executed by the hot spot computer of the radio communication system according to the first embodiment of the present invention.

Referring to FIG. 10, description will be given of a control structure for a program executed by hot spot computer 300 of the radio communication system in this embodiment. In S3000, CPU 320 of hot spot computer 300 determines whether or not the connection request command (FIG. 5) from cellular phone 200 is received. When the connection request command from cellular phone 200 is received ("YES" in S3000), the processing proceeds to S3002. If not ("NO" in S3000), the processing returns to S3000 to wait for the reception of the connection request command from cellular phone 200.

In S3002, CPU 320 determines whether or not the connection between hot spot computer 300 and cellular phone 200 is successfully established. When the connection is successful ("YES" in S3002), the processing proceeds to S3004. When the connection fails ("NO" in S3002), the processing returns to S3000.

In S3004, CPU 320 connects a line between hot spot computer 300 and cellular phone 200 using Bluetooth communication section 326. In S3006, CPU 320 connects a line between hot spot computer 300 and server 100 using network communication section 328.

In S3008, CPU 320 establishes a communication line between cellular phone 200 and server 100 using Bluetooth communication section 326 and network communication section 328.

In S3010, CPU 320 determines whether or not communication is finished. When the communication is finished ("YES" in S3010), the processing proceeds to S3012. When the communication is not finished ("NO" in S3010), the processing returns to S3010 to wait for the communication to be finished.

In S3012, CPU 320 performs a communication line disconnect process. Thereafter, the processing returns to S3000.

Description will be given of the operation of the radio communication system in this embodiment on the basis of the above-described structures and flow charts.

When server 100 receives a connection request command from communication station 600 (connection request command of the type from communication station 600 by "YES" in S1000, and in S1002), information contained in the connection request command is stored in fixed disk 124 of server 100 (in S1004). Using cellular phone communication network 126 of server 100, the connection request command is transmitted to cellular phone 200 (in S1006).

When cellular phone 200 receives the connection request command from server 100 ("YES" in S2000), a connection process for the connection between cellular phone 200 and hot spot computer 300 around cellular phone 200 is executed (in S2002). At this time, the connection request command is transmitted from cellular phone 200 to hot spot computer 300.

In hot spot computer 300, when the connection request command is received from cellular phone 200 ("YES" in S3000), it is determined whether or not the connection between hot spot computer 300 and cellular phone 200 is successfully established (in S3002). When the connection is successful ("YES" in S3002), a line is connected between hot spot computer 300 and cellular phone 200 using Bluetooth communication section 326 of hot spot computer 300 (in S3004).

In cellular phone 200, when the connection between cellular phone 200 and hot spot computer 300 is successfully established ("YES" in S2004), a connection response command (FIG. 6) including connection information on hot spot computer 300 is transmitted to server 100 (in S2006).

In server 100, when the connection response command is received from cellular phone 200 (the connection response command by "YES" in S 1000 and S 1002), information contained in the connection response command is stored (in S1008). When the connection is successfully established ("YES" in S1010), a Bluetooth communication channel via hot spot computer 300 is established using network communication section 128 of server 100 (in S1012).

In cellular phone 200, a line is connected between cellular phone 200 and hot spot computer 300 using Bluetooth communication section 250 (in S2008).

In hot spot computer 300, a line is connected between hot spot computer 300 and cellular phone 200 using Bluetooth communication section 326 (in S3004). In hot spot computer 300, a communication line is established between cellular phone 200 and server 100 using network communication section 328 (in S3008).

Communication is executed in such a state. At this moment, cellular phone 200 communicates with communication station 600 through hot spot computer 300 and server 100. In this state, when the communication between cellular phone 200 and communication station 600 is held and the communication is then finished ("YES" in S 1014, "YES" in S2010, and "YES" in S3010), communication line disconnect processes are respectively performed in server 100, cellular phone 200, and hot spot computer 300 (in S1016, S2012, and S3012).

When the connection between cellular phone 200 and hot spot computer 300 fails ("NO" in S2004), cellular phone 200 transmits a connection response command (FIG. 6) including a connection failure reason to server 100 (in S2014). In server 100, when the connection response command including the connection failure reason is received ("YES" in S1000, and the connection response command from cellular phone 200 in S1002), information contained in the connection response command is stored (in S1008). Since the connection fails ("NO" in S1010), server 100 notifies communication station 600 of the reason that connection cannot be held (in S1018).

As can be seen, according to the radio communication system of the first embodiment, the server that receives the connection request from the communication station to the cellular phone transmits the connection request to the cellular phone via cellular phone communication network. The cellular phone establishes short-distance radio communication with the hot spot computer on the basis of the connection request. When the short-distance radio communication is established, the cellular phone holds communication with the communication station through the host spot computer, the networks, and the server. When a communication channel for the short-distance radio communication between the cellular phone and the hot spot computer cannot be established, the cellular phone transmits the reason that the communication is not established to the communication station through the cellular phone communication network and the server. The user of the communication station can thus know the reason that the cellular phone fails in short-distance radio communication. As a result, the radio communication system which enables an originator to know the reason on the part of the receiving end that radio communication cannot be held.

Second Embodiment

Description will be given of a radio communication system according to a second embodiment of the present invention. It is noted that the server, the cellular phone, and the hot spot computer of the radio communication system according to the second embodiment are equal in hardware configuration to those of the radio communication system according to the first embodiment. Therefore, they will not be repeatedly described herein in detail.

Referring to FIG. 11, description will be given of a communication history table stored in fixed disk 120 of server 100 in this embodiment. As shown in FIG. 11, this communication history table stores connection information on cellular phone 200, connection information on hot spot computer 300, and time when the communication line between cellular phone 200 and hot spot computer 300 is disconnected.

Figure 12:
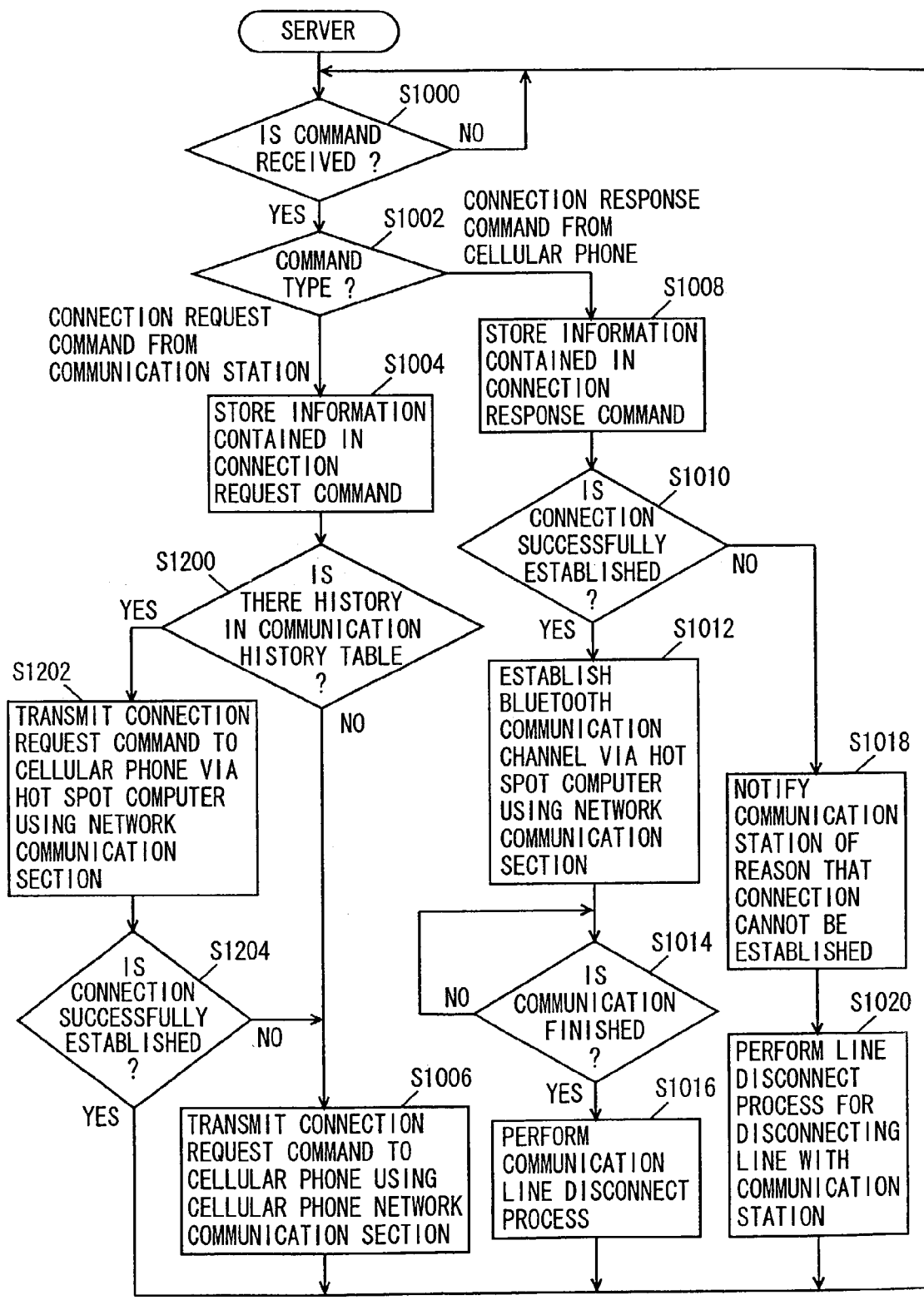
FIG. 12 is a flow chart for a process executed by the server of the radio communication system according to the second embodiment of the present invention.

Referring to FIG. 12, description will be given of a control structure for a program executed by server 100 according to the second embodiment. It is noted that the same processes as those in the flow chart of FIG. 8 described above are respectively denoted by the same reference symbols in the flow chart of FIG. 12 and that processes for them are the same. Therefore, they will not be repeatedly described herein in detail.

In S1200, CPU 120 of server 100 determines whether nor not there is a history in the communication history table (FIG. 11) stored in fixed disk 124. This determination is on the basis of the connection information on cellular phone 200 contained in a communication request command (FIG. 5). When there is a history in the communication history table ("YES" in S1200), the processing proceeds to S1202. If not ("NO" in S1200), the processing proceeds to S 1006.

In S1202, CPU 120 transmits a connection request command to cellular phone 200 via hot spot computer 300 using network communication section 128. In S1204, CPU 120 determines whether or not the communication between cellular phone 200 and hot spot computer 300 is successfully established. When the connection is successful ("YES" in S1204), the processing proceeds to S1000. When the connection fails ("NO" in S1204), the processing proceeds to S1006.

Figure 13:
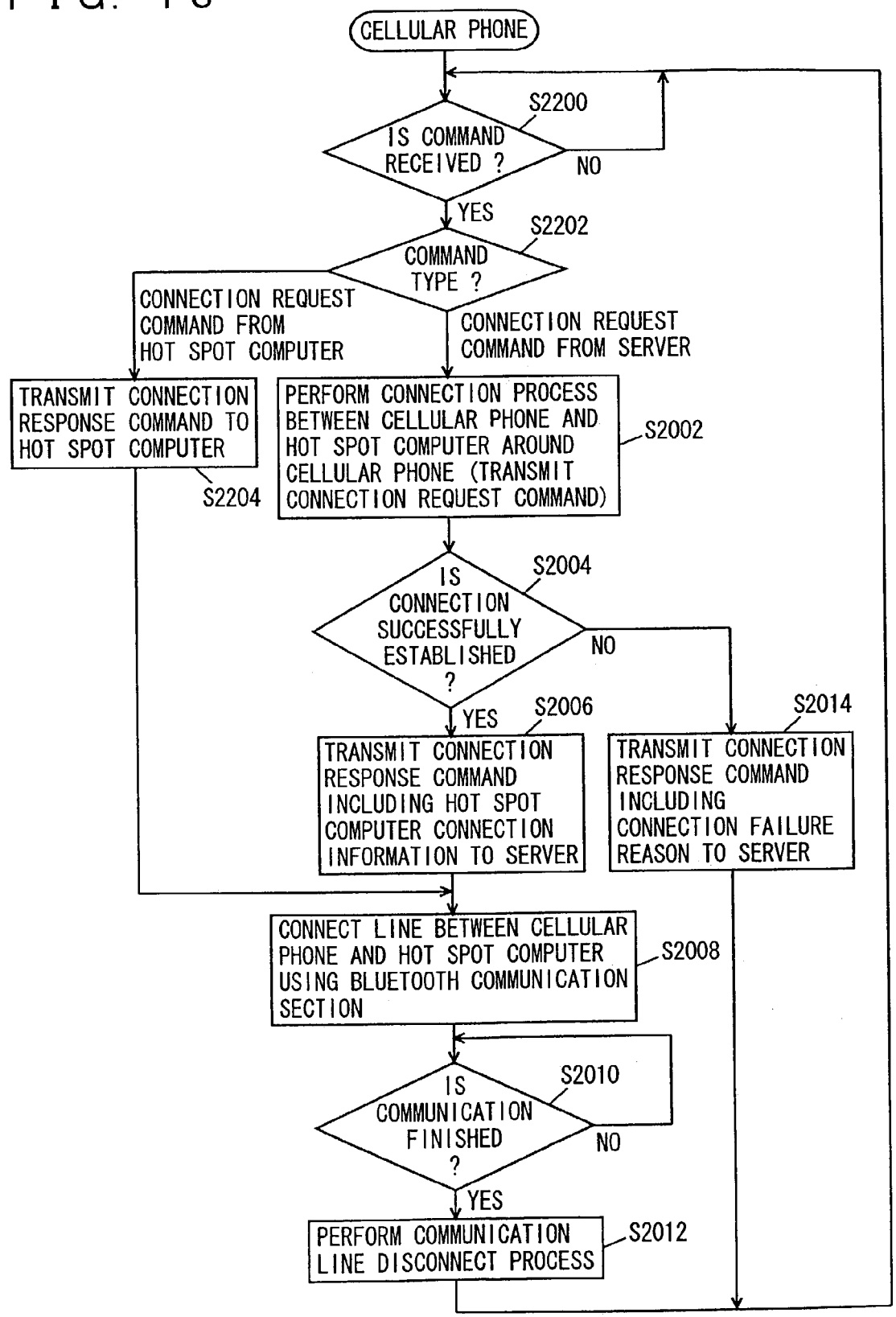
FIG. 13 is a flow chart for a process executed by a cellular phone of the radio communication system according to the second embodiment of the present invention.

Referring to FIG. 13, description will be given of a control structure for a program executed by cellular phone 200 of the radio communication system in this embodiment. It is noted that the same processes as those in the flow chart of FIG. 9 described above are respectively denoted by the same reference symbols in the flow chart of FIG. 13 and that processes for them are the same. Therefore, they will not be repeatedly described herein in detail.

In S2200, control section 220 of cellular phone 200 determines whether or not a command is received. When a command is received ("YES" in S2200), the processing proceeds to S2200. If not ("NO" in S2200), the processing returns to S2202 to wait for the reception of a command.

In S2202, control section 220 determines the type of the command. When the command is a connection request command from hot spot computer 300, the processing proceeds to S2204. When the command is a connection request command from server 100, the processing proceeds to S2002.

In S2204, control section 220 transmits the connection response command to hot spot computer 300. Thereafter, the processing proceeds to S2008.

Figure 14:
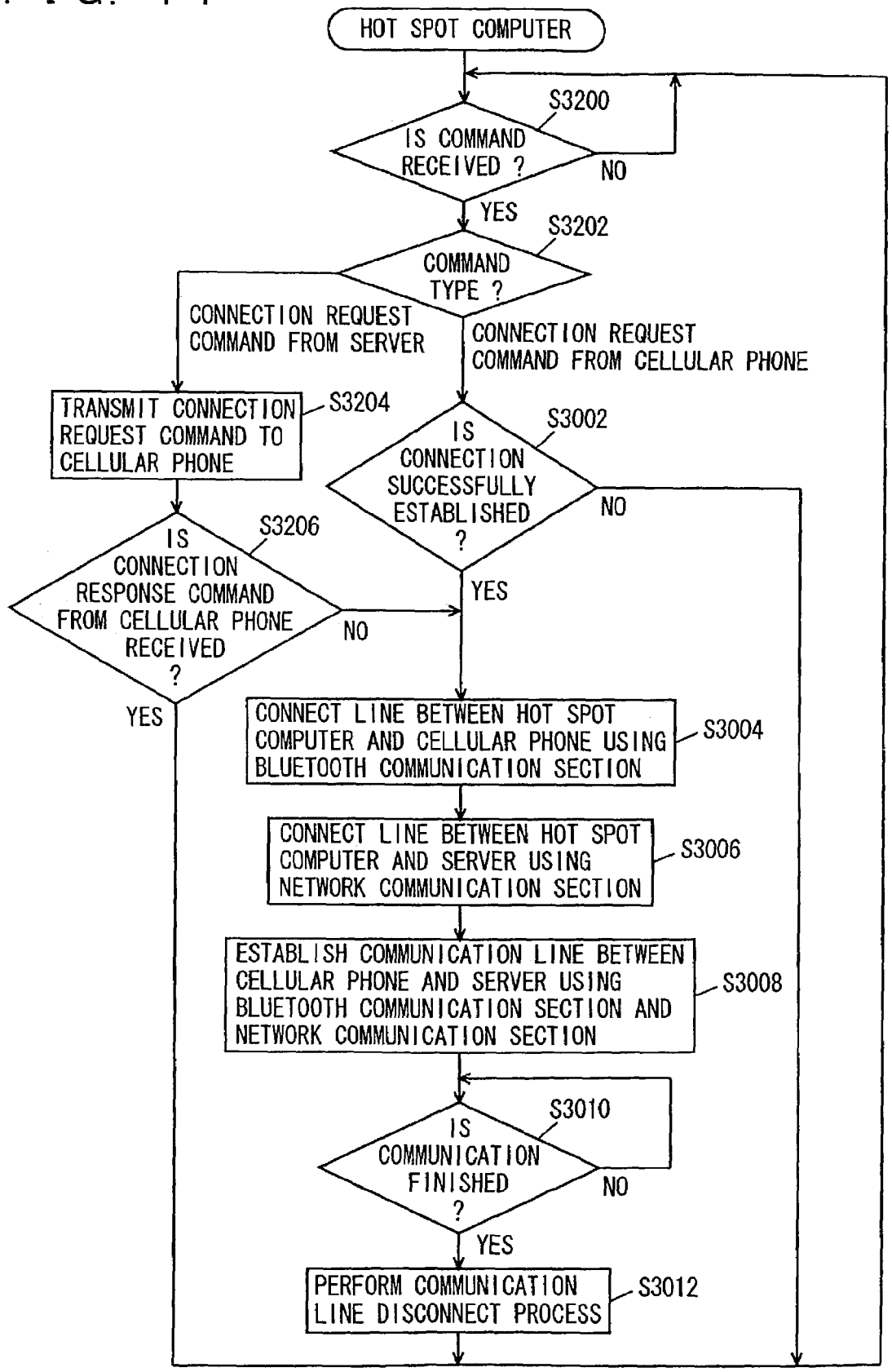
FIG. 14 is a flow chart for a process executed by a hot spot computer of the radio communication system according to the second embodiment of the present invention.

Referring to FIG. 14, description will be given of a control structure for a program executed by hot spot computer 300 of the radio communication system in this embodiment. It is noted that the same processes as those in the flow chart of FIG. 10 described above are respectively denoted by the same reference symbols in the flow chart of FIG. 14 and that processes for them are the same. Therefore, they will not be repeatedly described herein in detail.

In S3200, CPU 320 of hot spot computer 300 determines whether or not a command is received. When a command is received ("YES" in S3200), the processing proceeds to S3202. If not ("NO" in S3200), the processing returns to S3200 to wait for the reception of a command.

In S3202, CPU 320 determines the type of the command. When the received command is the connection request command from server 100, the processing proceeds to S3204. When the received command is the connection request command from cellular phone 200, the processing proceeds to S3002.

In S3204, CPU 320 transmits the connection request command to cellular phone 200. In S3206, CPU 320 determines whether or not a connection response command from cellular phone 200 is received. When the connection response command is received from cellular phone 200 ("YES" in S3206), the processing proceeds to S3200. If not ("NO" in S3206), the processing proceeds to S3004.

Description will be given of the operation of the radio communication system in this embodiment on the basis of the above-described structures and flow charts.

In server 100, when the connection request command from communication station 600 is received (the connection request command of the type from communication station 600 by "YES" in S 1000 and S1002), information contained in the connection request command is stored (in S1004). Referring to communication history table (FIG. 11), when there is a communication history ("YES" in S1200), server 100 transmits the connection request command to cellular phone 200 via hot spot computer 300 using network communication section 128 (in S1202). In hot spot computer 300, the connection request command from server 100 is directly received and transmitted to cellular phone 200 (in S3204).

As can be seen, according to the radio communication system in the second embodiment, the communication history between the hot spot computer and the mobile terminal is stored, the server that receives a new connection request refers to the history and directly connects the hot spot computer to the mobile terminal, between which there is the communication history, over the Bluetooth communication.

According to the radio communication system in this embodiment, the server stores the communication history between the cellular phone and the hot spot computer. Due to this, by referring to the connection request from the communication station and the communication history therefor, it is possible to connect the notification of the connection request to the cellular phone directly from the hot spot computer to the cellular phone without using the cellular phone communication network.

Third Embodiment

Description will be given of a radio communication system according to a third embodiment. It is noted that the server, the cellular phone, and the hot spot computer of the radio communication system according to the third embodiment are equal in hardware configuration to those of the radio communication system according to the first embodiment. Therefore, they will not be repeatedly described herein in detail.

Figures 15, 16:
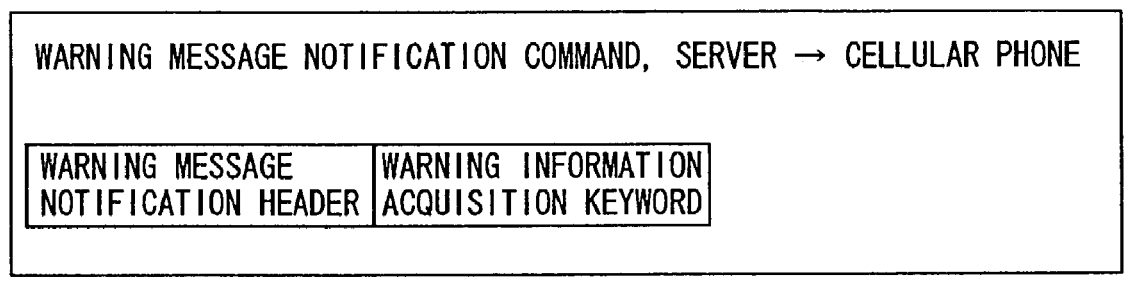
FIG. 15 represents a warning message notification command according to a third embodiment of the present invention.
FIG. 16 is an information table stored in a host spot computer of a radio communication system according to the third embodiment of the present invention.

Referring to FIG. 15, description will be given of a warning message notification command transmitted from server 100 to cellular phone 200. As shown in FIG. 15, the warning message notification command includes a warning message notification header and a warning information acquisition keyword. Referring to FIG. 16, description will be given of an information table stored in hot spot computer 300 in this embodiment. As shown in FIG. 16, the information table includes warning information acquisition keywords and detailed information on the periphery of hot spot computer 300 corresponding to the keywords.

Figure 17:
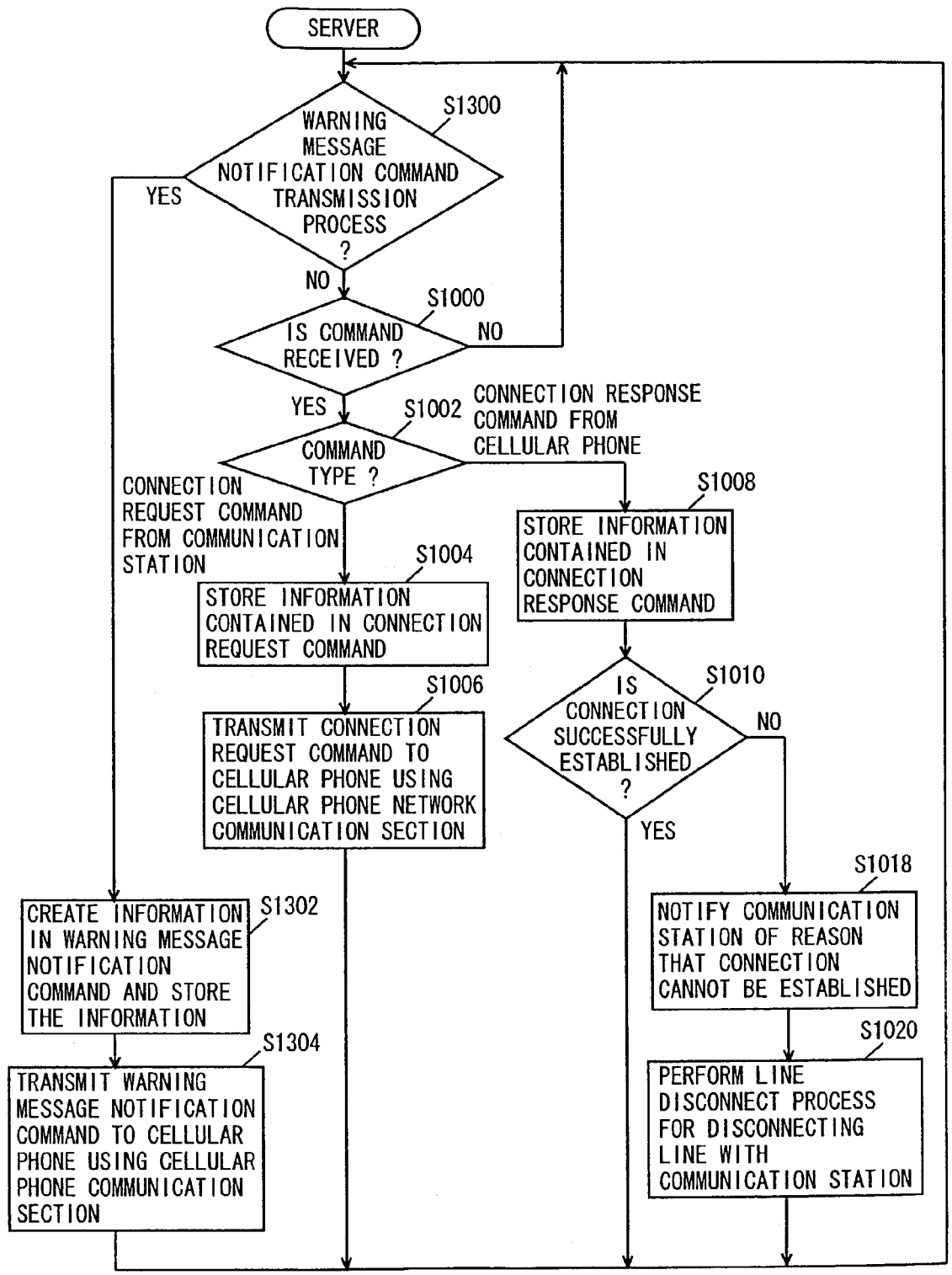
FIG. 17 is a flow chart for a process executed by a server of the radio communication system according to the third embodiment of the present invention.

Referring to FIG. 17, description will be given of a control structure for a program executed by server 100 of radio communication system in this embodiment. It is noted that the same processes as those in the flow chart of FIG. 8 described above are respectively denoted by the same reference symbols in the flow chart of FIG. 17 and that processes for them are the same. Therefore, they will not be repeatedly described herein in detail.

In S1300, CPU 120 of server 100 determines whether or not a warning message notification command transmission process is to be performed. When the warning message notification command transmission process is to be performed ("YES" in S1300), the processing proceeds to S1302. If not ("NO" in S1300), the processing proceeds to S1000.

In S1302, CPU 120 creates information contained in the warning message notification command and stores the information. In S1304, CPU 120 transmits the warning message notification command (FIG. 15) to cellular phone 200 using cellular phone network communication section 126. Thereafter, the processing returns to S1300.

Figure 18:
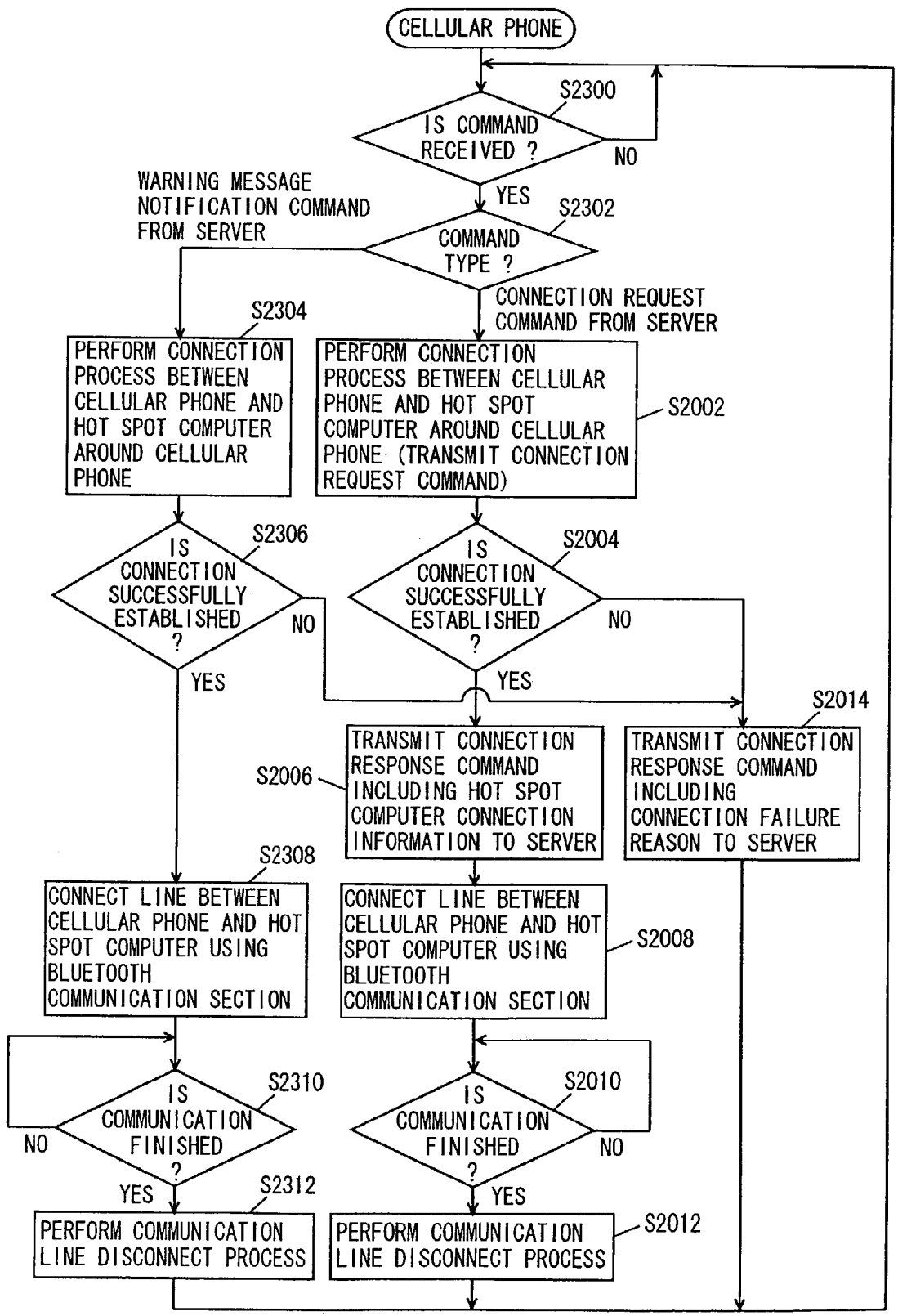
FIG. 18 is a flow chart for a process executed by a cellular phone of the radio communication system according to the third embodiment of the present invention.

Referring to FIG. 18, description will be given of a control structure for a program executed by cellular phone 200 of the radio communication system in this embodiment. It is noted that the same processes as those in the flow chart of FIG. 9 described above are respectively denoted by the same reference symbols in the flow chart of FIG. 18 and that processes for them are the same. Therefore, they will not be repeatedly described herein in detail.

In S2300, control section 220 of cellular phone 200 determines whether or not a command is received. When a command is received ("YES" in S2300), the processing proceeds to S2302. If not ("NO" in S2300), the processing returns to S2300 to wait for the reception of a command.

In S2302, control section 220 determines the type of the command. When the received command is a warning message notification command (FIG. 15) from server 100, the processing proceeds to S2304. When the received command is a connection request command from server 100, the processing proceeds to S2002.

In S2304, control section 220 performs a connection process for the connection between cellular phone 200 and hot sport computer 300 around cellular phone 200. In S2306, control section 220 determines whether or not the connection is successfully established. When the connection is successful ("YES" in S2306), the processing proceeds to S2308. If not ("NO" in S2306), the processing proceeds to S2014.

In S2308, control section 220 connects the line between cellular phone 200 and hot spot computer 300 using Bluetooth communication section 250. In S2310, control section 220 determines whether or not the communication between cellular phone 200 and communication station 600 is finished. When the communication is finished ("YES" in S2310), the processing proceeds to S2312. If not ("NO" in S2310), the processing returns to S2310 to wait for the communication to be finished.

In S2312, control section 220 performs a communication line disconnect process. Thereafter, the processing proceeds to S2300.

Figure 19:
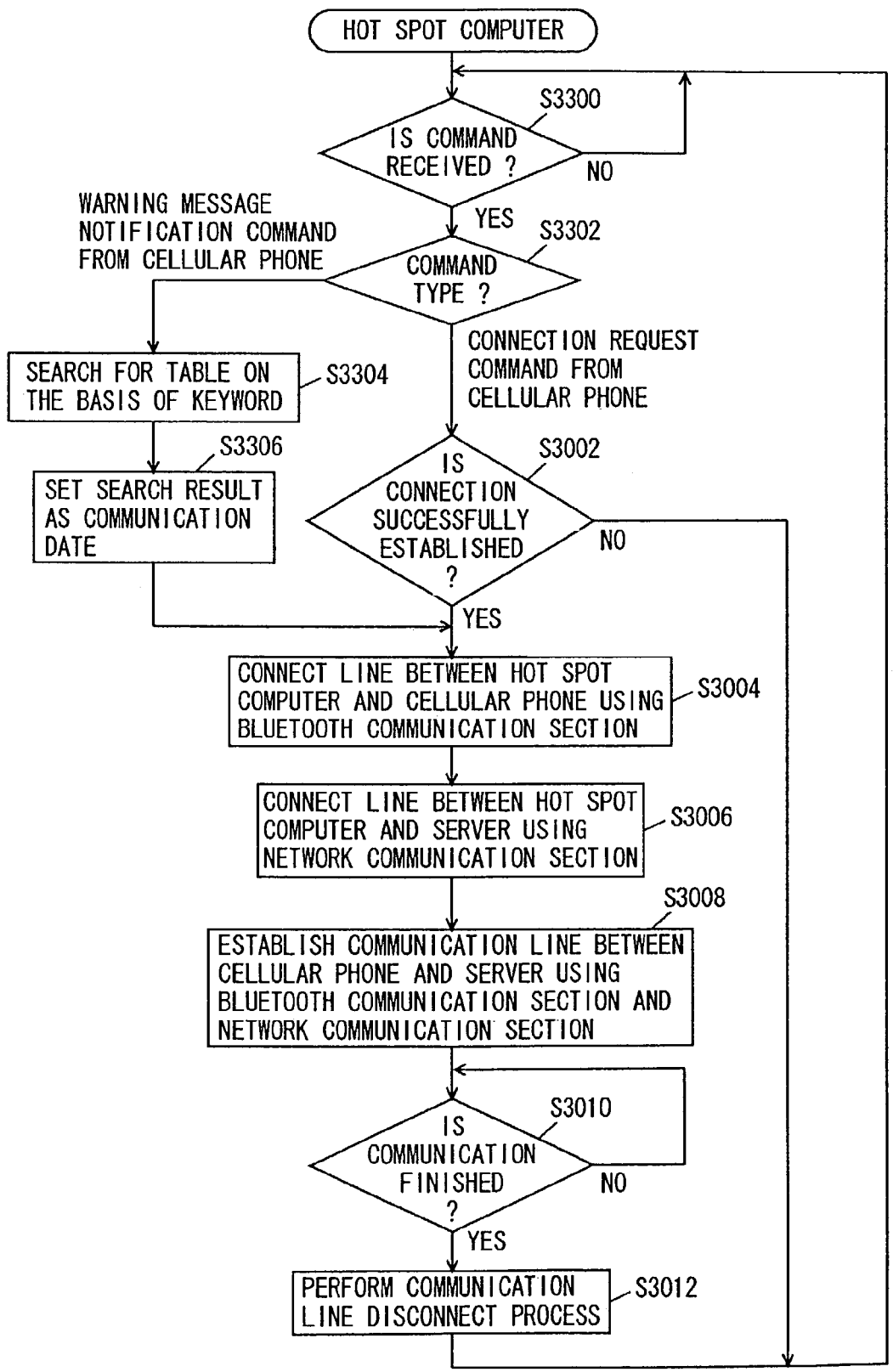
FIG. 19 is a flow chart for a process executed by the hot spot computer of the radio communication system according to the third embodiment of the present invention.

Referring to FIG. 19, description will be given of a control structure for a program executed by hot spot computer 300 of the radio communication system in this embodiment. It is noted that the same processes as those in the flow chart of FIG. 10 described above are respectively denoted by the same reference symbols in the flow chart of FIG. 19 and that processes for them are the same. Therefore, they will not be repeatedly described herein in detail.

In S3300, CPU 320 of hot spot computer 300 determines whether or not a command is received. When a command is received ("YES" in S3300), the processing proceeds to S3302. When a command is not received ("NO" in S3300), the processing returns to S3300 to wait for the reception of the command.

In S3302, CPU 320 determines the type of the command. When the received command is a warning message notification command from cellular phone 200, the processing proceeds to S3304. When the received command is a connection request command from cellular phone 200, the processing proceeds to S3002.

In S3304, CPU 320 searches for the table on the basis of a keyword. The keyword used at this time is the same as the warning information acquisition keyword included in the warning message notification command shown in FIG. 15. In S3306, CPU 320 sets a search result as communication data. Thereafter, the processing proceeds to S3004.

Description will be given of the operation of the radio communication system in this embodiment on the basis of the above-described structures and flow charts.

In server 100, when it is determined that the warning message notification command transmission process is executed ("YES" in S1300), server 100 creates information to be contained in the warning message notification command (in S1302) and transmits the warning message notification command to cellular phone 200 using cellular phone network communication section 126 (in S1304).

In cellular phone 200, when the warning message notification command from server 100 is received (the warning message notification command of such a type as the command from server 100 by "YES" in S2300 and S2302), a connection process for the connection between cellular phone 200 and hot spot computer 300 around cellular phone 200 is performed (in S2304). At this time, the warning message notification command is transmitted from cellular phone 200 to hot spot computer 300.

In hot spot computer 300, when the warning message notification command from cellular phone 200 is received (the warning message notification command of such a type as the command from cellular phone 200 by "YES" in S3300 and S3302), the table is searched on the basis of the keyword (in S3304). A search result is set as communication data (in S3306) and transmitted to cellular phone 200 using Bluetooth communication section 326 of hot spot computer 300 and Bluetooth communication section 250 of cellular phone 200.

As can be seen, according to the radio communication system in the third embodiment, on the basis of the keyword transmitted from the server to the cellular phone, information corresponding to the keyword stored in the hot spot computer is transmitted to the cellular phone. Regional information corresponding to the location where the hot spot computer is installed is stored in the hot spot computer. When it is necessary to acquire detailed information on the region where the cellular phone is currently present, only the keyword is acquired from the server and transmitted to the hot spot computer around the cellular phone, whereby it is possible to acquire the detailed information on the periphery of the cellular phone on the basis of the keyword.

Fourth Embodiment

Description will be given of a radio communication system according to a fourth embodiment. It is noted that the server, the cellular phone, and the hot spot computer of the radio communication system according to the fourth embodiment are equal in hardware configuration to those of the radio communication system according to the first embodiment. Therefore, they will not be repeatedly described herein in detail.

Figure 20:
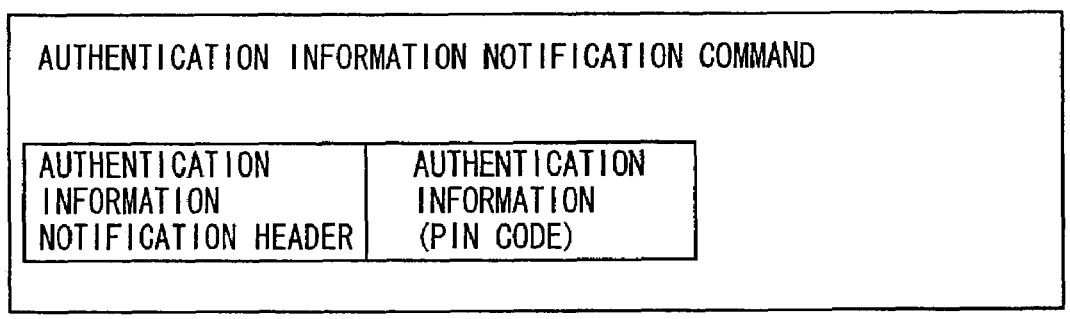
FIG. 20 represents an authentication information notification command according to a fourth embodiment of the present invention.

Referring to FIG. 20, description will be given of an authentication information notification command. As shown in FIG. 20, the authentication information notification command includes an authentication information notification header and authentication information (PIN code). The PIN code is a code for identifying an individual in the communication between cellular phone 200 and hot spot computer 300.

Figure 21:
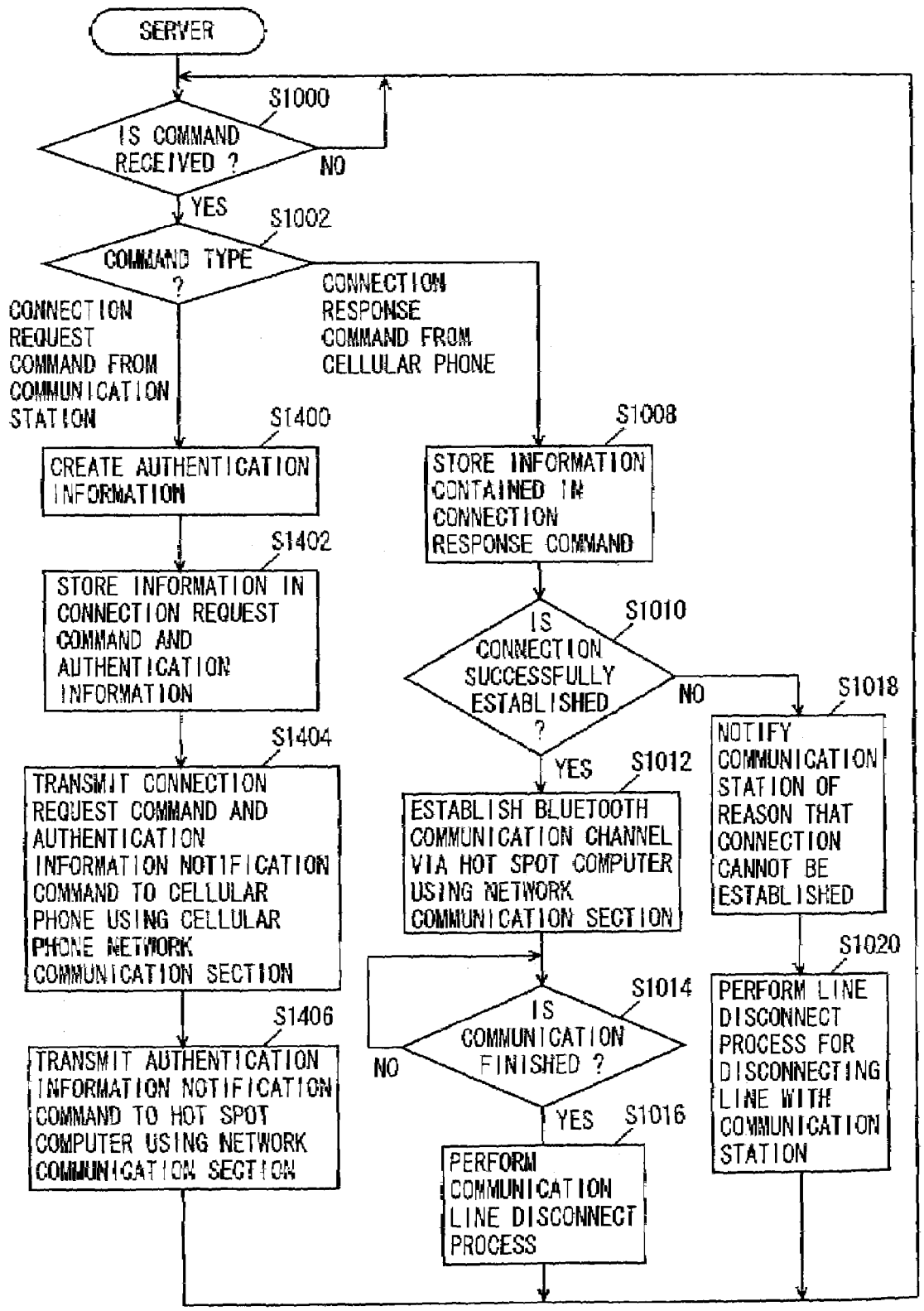
FIG. 21 is a flow chart for a process executed by a server of a radio communication system according to the fourth embodiment of the present invention.

Referring to FIG. 21, description will be given of a control structure for a program executed by server 100 of the radio communication system in this embodiment. It is noted that the same processes as those in the flow chart of FIG. 8 described above are respectively denoted by the same reference symbols in the flow chart of FIG. 21 and are equal in function. Therefore, they will not be repeatedly described herein in detail.

In S 1400, CPU 120 of server 100 creates authentication information. In S 1402, CPU 120 stores information contained in a connection request command and the authentication information. In S1404, CPU 120 transmits the connection request command and the authentication information notification command to cellular phone 200 using cellular phone network communication section 126. In S1406, CPU 120 transmits the authentication information notification command to hot spot computer 300 using network communication section 128. Thereafter, the processing returns to S1000.

Referring to FIG. 22, description will be given of a control structure for a program executed by cellular phone 200 of the radio communication system in this embodiment. It is noted that the same processes as those in the flow chart of FIG. 9 described above are respectively denoted by the same reference symbols in the flow chart of FIG. 22 and equal in function. Therefore, they will not be repeatedly described herein in detail.

In S2400, control section 220 of cellular phone 200 determines whether or not the connection request command and the authentication information notification command are received from server 100. When the connection request command and the authentication information notification command are received from server 100 ("YES" in S2400), the processing proceeds to S2402. If not ("NO" in S2400), the processing returns to S2400 to wait for the reception of the connection request command and the authentication information notification command from server 100.

In S2402, control section 220 stores the received authentication information.

In S2404, control section 220 connects the line between cellular phone 200 and hot spot computer 300 on the basis of the authentication information using Bluetooth communication section 250.

Referring to FIG. 23, description will be given of a control structure for a program executed by hot spot computer 300 of the radio communication system in this embodiment. It is noted that the same processes as those in the flow chart of FIG. 10 described above are respectively denoted by the same reference symbols in the flow chart of FIG. 23 and equal in function. Therefore, they will not be repeatedly described herein in detail.

In S3400, CPU 320 of hot spot computer 300 determines whether or not a command is received. When a command is received ("YES" in S3400), the processing proceeds to S3402. When a command is not received ("NO" in S3400), the processing returns to S3400 to wait for the reception of the command.

In S3402, CPU 320 determines the type of the command. When the received command is the authentication information notification command from server 100, the processing proceeds to S3406. When the received command is the connection request command using the authentication information from cellular phone 200, the processing proceeds to S3000.

In S3404, CPU 320 connects the line between hot spot computer 300 and cellular phone 200 on the basis of the authentication information using Bluetooth communication section 326.

In S3406, CPU 320 stores information contained in the received authentication information notification command.

Description will be given of the operation of the radio communication system in this embodiment on the basis of the above-described structures and flow charts.

In server 100, the authentication information is created (in S1400), and the information contained in the connection request command and the authentication information are stored (in S1402). Server 100 transmits the connection request command and the authentication information notification command to cellular phone 200 using cellular phone network communication section 126 (in S1404), and transmits the authentication information notification command to hot spot computer 300 using network communication section 128. As a result, the authentication information created by server 100 is transmitted to both cellular phone 200 and hot spot computer 300.

In cellular phone 200, when the connection request command and the authentication information notification command are received from server 100 ("YES" in S2400), the line between cellular phone 200 and hot spot computer 300 is connected using the received authentication information (in S2404).

In hot spot computer 300, when the authentication information notification command from server 100 is received, the information contained in the received authentication information notification command is stored. One piece of the stored information is authentication information. In hot spot computer 300, the line between hot spot computer 300 and cellular phone 200 is connected on the basis of the authentication information using Bluetooth communication section 326 (in S3404).

As can be seen, according to the radio communication system in the fourth embodiment, the server creates authentication information. The server transmits the created authentication information to the hot spot computer and the cellular phone. The cellular phone authenticates the connection between the cellular phone and the hot spot computer on the basis of the authentication information received from the server, and the hot spot computer authenticates the connection therebetween on the basis of the authentication information received from the server. Thus, common authentication information is created by the server computer and shared between the cellular phone and the hot spot computer. Due to this, it is unnecessary to store common authentication information in both the cellular phone and the hot spot computer in advance, and it is thereby possible to determine the authentication information according to various situations and to improve communication privacy.

Fifth Embodiment

Description will be given of a radio communication system according to a fifth embodiment. It is noted that the server, the cellular phone, and the hot spot computer of the radio communication system according to the fifth embodiment are equal in hardware configuration to those of the radio communication system according to the first embodiment. Therefore, they will not be repeatedly described herein in detail.

Figure 24:
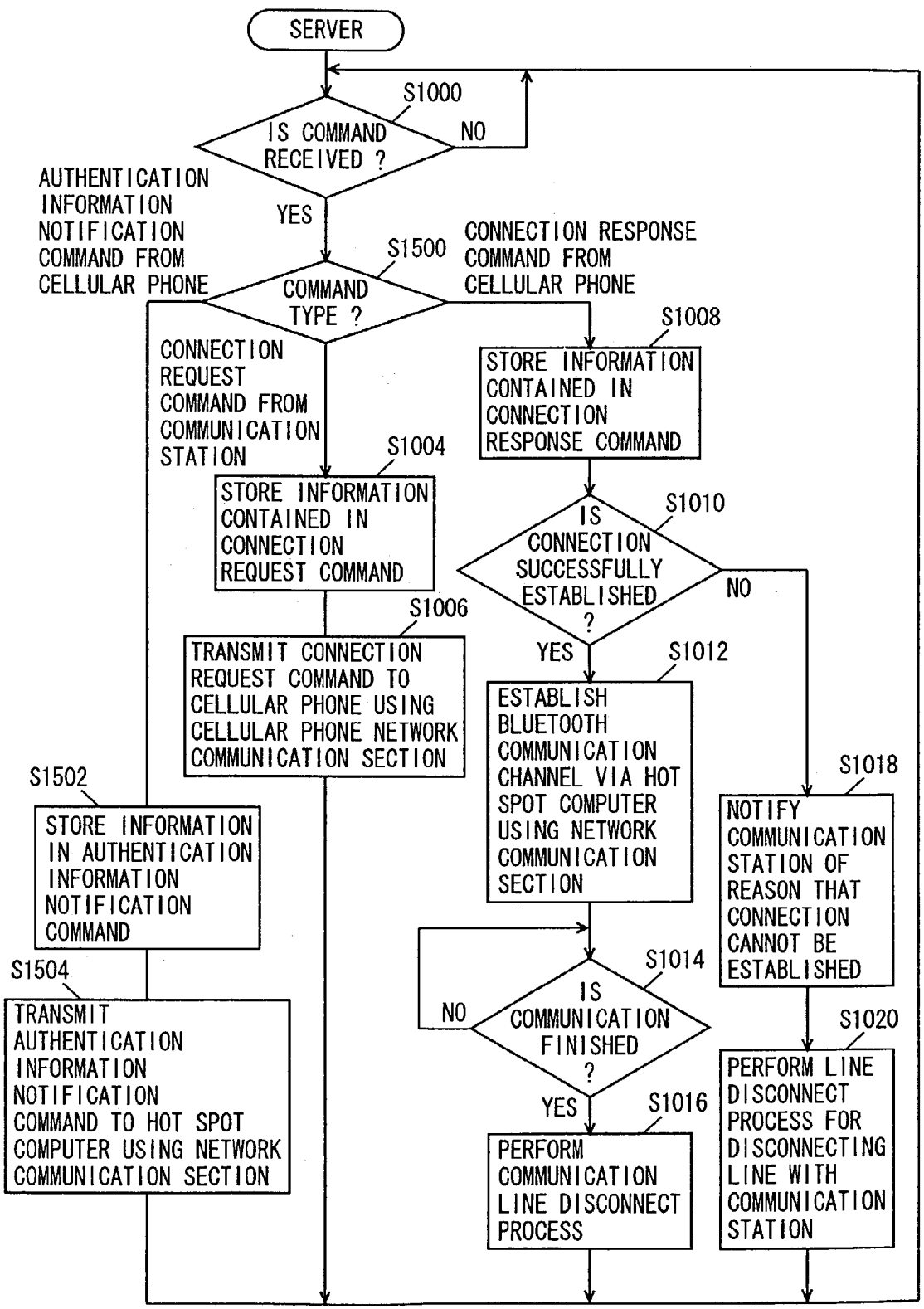
FIG. 24 is a flow chart for a process executed by a server of a radio communication system according to a fifth embodiment of the present invention.

Referring to FIG. 24, description will be given of a control structure for a program executed by server 100 of the radio communication system in this embodiment. It is noted that the same processes as those in the flow chart of FIG. 8 described above are respectively denoted by the same reference symbols in the flow chart of FIG. 24 and are equal in function. Therefore, they will not be repeatedly described herein in detail.

In S1500, CPU 120 of server 100 determines the type of a received command. When the received command is an authentication information notification command from cellular phone 200, the processing proceeds to S 1502. When the received command is a communication request command from communication station 600, the processing proceeds to S1004. When the received command is a connection response command from cellular phone 200, the processing proceeds to S1008.

In S1502, CPU 120 stores information contained in the authentication information notification command. In S1504, server 100 transmits the authentication information notification command to hot spot computer 300 using network communication section 128.

Figure 25:
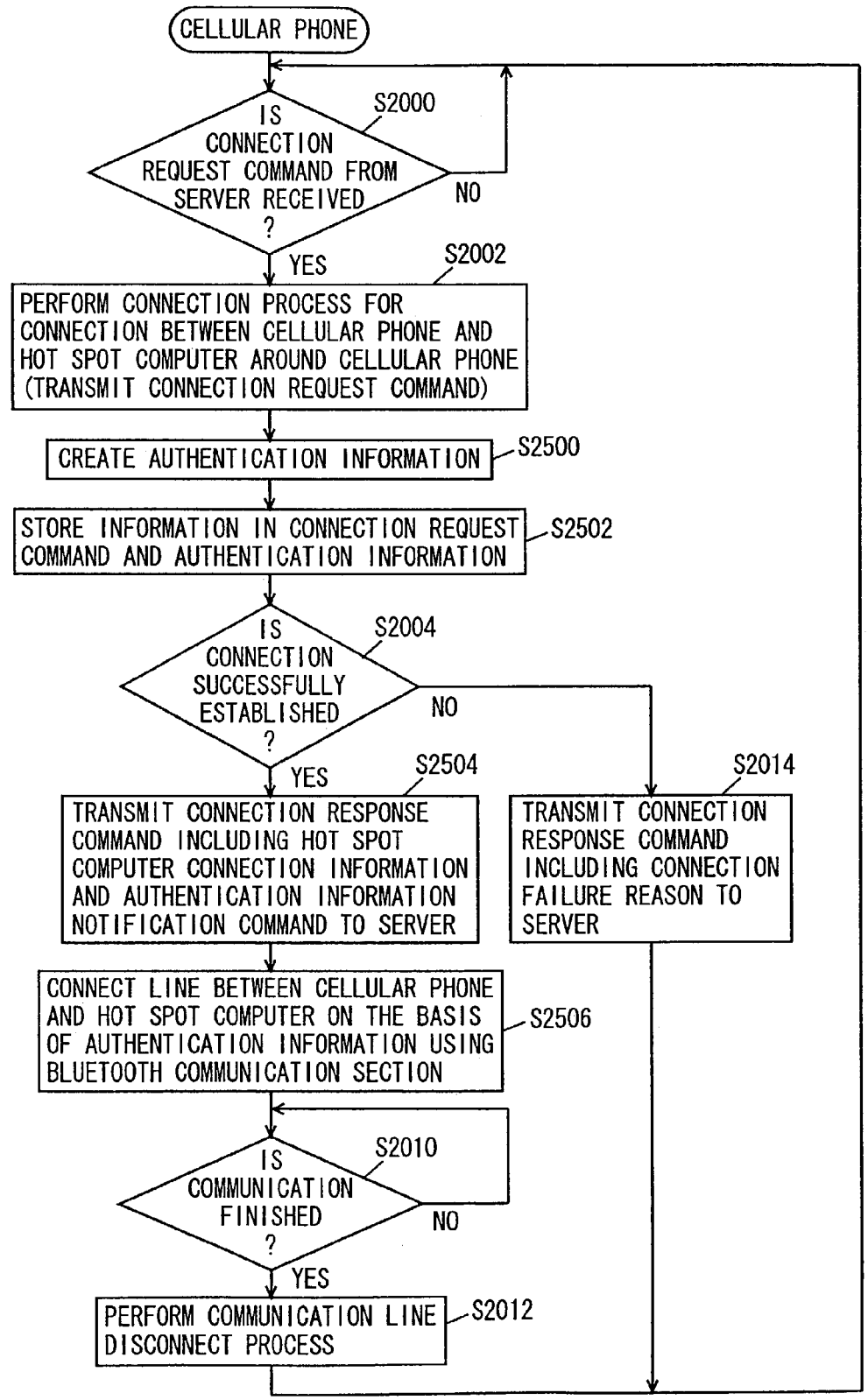
FIG. 25 is a flow chart for a process executed by a cellular phone of the radio communication system according to the fifth embodiment of the present invention.

Referring to FIG. 25, description will be given of a control structure for a program executed by cellular phone 200 of the radio communication system in this embodiment. It is noted that the same processes as those in the flow chart of FIG. 9 described above are respectively denoted by the same reference symbols in the flow chart of FIG. 25 and equal in function. Therefore, they will not be repeatedly described herein in detail.

In S2500, control section 220 of cellular phone 200 creates authentication information. In S2502, control section 220 stores information in the connection request command and the authentication information.

In S2504, control section 220 transmits the connection response command and the authentication information notification command including connection information on hot spot computer 300 to server 100. In S2506, control section 220 connects the line between cellular phone 200 and hot spot computer 300 on the basis of the authentication information using Bluetooth communication section 250.

It is noted that a flow chart executed by hot spot computer 300 of the radio communication system in this embodiment is equal to the flow chart shown in FIG. 23. Therefore, the flow chart will not be repeatedly described herein in detail.

Description will be given of the operation of the radio communication system in this embodiment on the basis of the above-described structures and flow charts.

When receiving the connection request command from server 100 ("YES" in S2000), cellular phone 200 creates the authentication information (in S2500). The information contained in the connection request command and the authentication information are stored (in S2502). The connection response command and the authentication information notification command including connection information on hot spot computer 300 are transmitted from cellular phone 200 to server 100.

Server 100 that receives the authentication information notification command from cellular phone 200 stores the information contained in the authentication information notification command (in S1502). Server 100 transmits the authentication information notification command to hot spot computer 300 using network communication section 128 (in S1504).

As can be seen, according to the radio communication system in the fifth embodiment, the cellular phone creates authentication information. The cellular phone transmits the created authentication information to the server. The server transmits the received authentication information to the hot spot computer. The cellular phone authenticates the connection between the cellular phone and the hot spot computer on the basis of the authentication information created by the cellular phone, and the hot spot computer authenticates the connection between the cellular phone and the hot spot computer on the basis of the authentication information received from the server. Thus, common authentication information is created by the cellular phone and shared between the cellular phone and the hot spot computer. Due to this, it is unnecessary to store common authentication information in both the cellular phone and the hot spot computer in advance, and it is thereby possible to determine the authentication information according to various situations and to improve communication privacy.

Sixth Embodiment

Description will be given of a radio communication system according to a sixth embodiment. It is noted that the server, the cellular phone, and the hot spot computer of the radio communication system according to the sixth embodiment are equal in hardware configuration to those of the radio communication system according to the first embodiment. Therefore, they will not be repeatedly described herein in detail.

Referring to FIG. 26, description will be given of an authentication information creation request command. As shown in FIG. 26, the authentication information creation request command is transmitted from server 100 to hot spot computer 300, and includes an authentication information creation request header for identifying the type of information.

Figure 27:
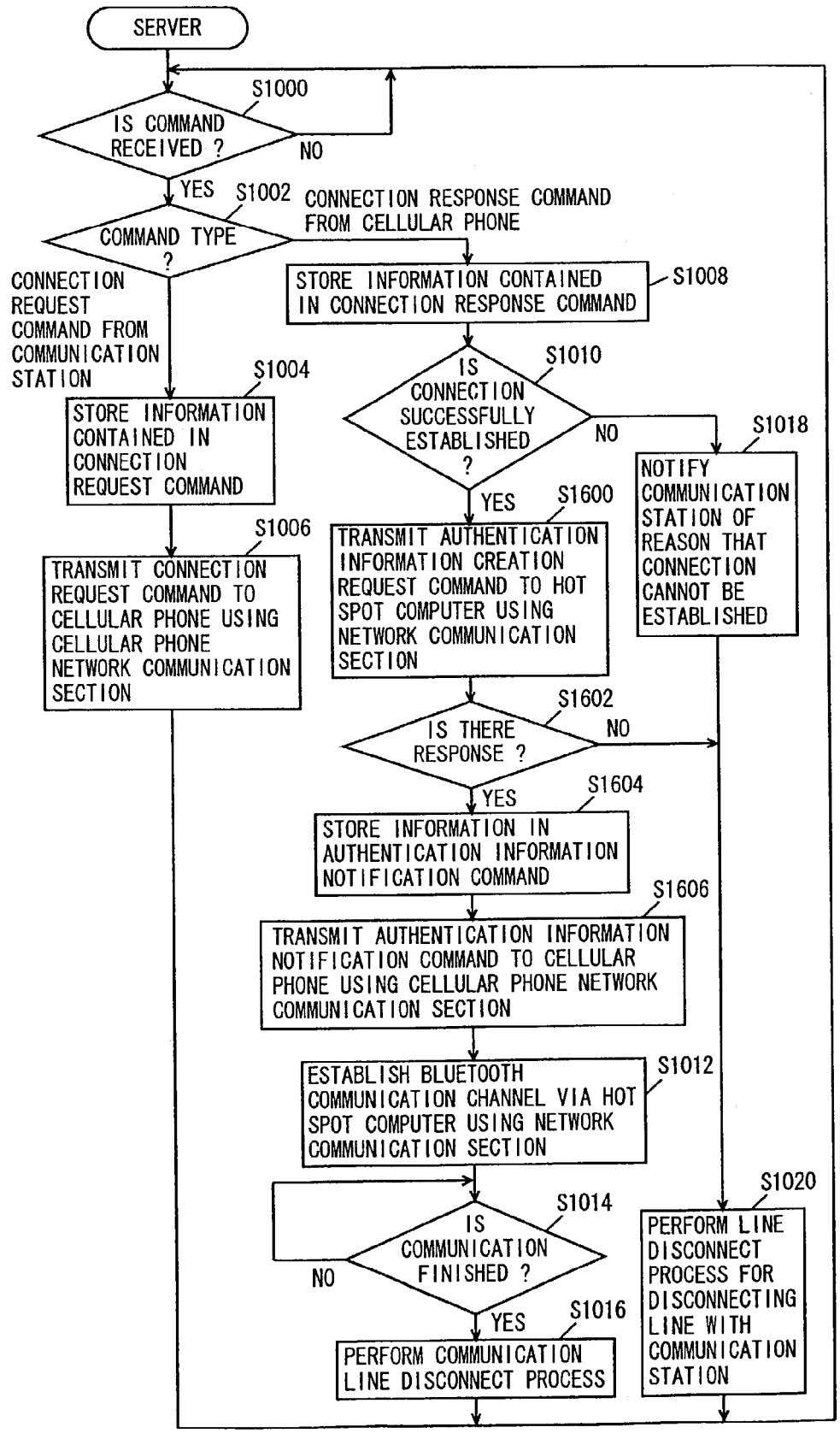
FIG. 27 is a flow chart for a process executed by a server of a radio communication system according to the sixth embodiment of the present invention.

Referring to FIG. 27, description will be given of a control structure for a program executed by server 100 of the radio communication system in this embodiment. It is noted that the same processes as those in the flow chart of FIG. 8 described above are respectively denoted by the same reference symbols in the flow chart of FIG. 27 and are equal in function. Therefore, they will not be repeatedly described herein in detail.

In S1600, CPU 120 of server 100 transmits the authentication information creation request command to hot spot computer 300 using network communication section 128. In S1602, CPU 120 determines whether or not there is a response from hot spot computer 300. When there is a response ("YES" in S1602), the processing proceeds to S1604. If not ("NO" in S1602), the processing proceeds to S1020.

In S1604, CPU 120 stores information contained in the authentication information notification command. In S1606, CPU 120 transmits the authentication information notification command to cellular phone 200 using cellular phone network communication section 126.

Figure 28:
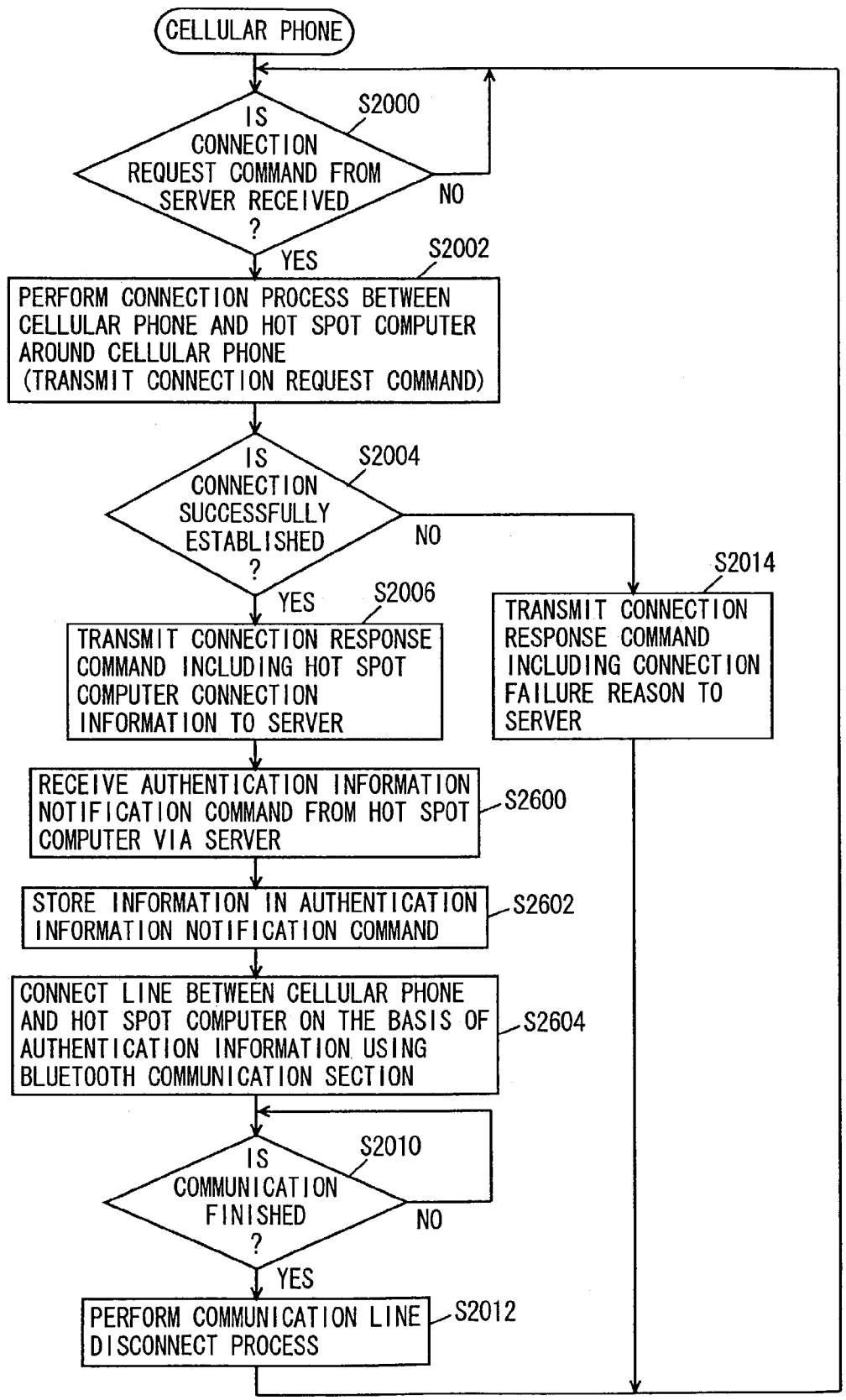
FIG. 28 is a flow chart for a process executed by a cellular phone of the radio communication system according to the sixth embodiment of the present invention.

Referring to FIG. 28, description will be given of a control structure for a program executed by cellular phone 200 of the radio communication system in this embodiment. It is noted that the same processes as those in the flow chart of FIG. 9 described above are respectively denoted by the same reference symbols in the flow chart of FIG. 28 and that processes therefor are the same. Therefore, they will not be repeatedly described herein in detail.

In S2600, control section 220 of cellular phone 200 receives the authentication information notification command from hot spot computer 300 via server 100. In S2602, control section 220 stores information contained in the authentication information notification command. In S2604, control section 220 connects the line between cellular phone 200 and hot spot computer 300 on the basis of authentication information using Bluetooth communication section 250.

Figure 29:
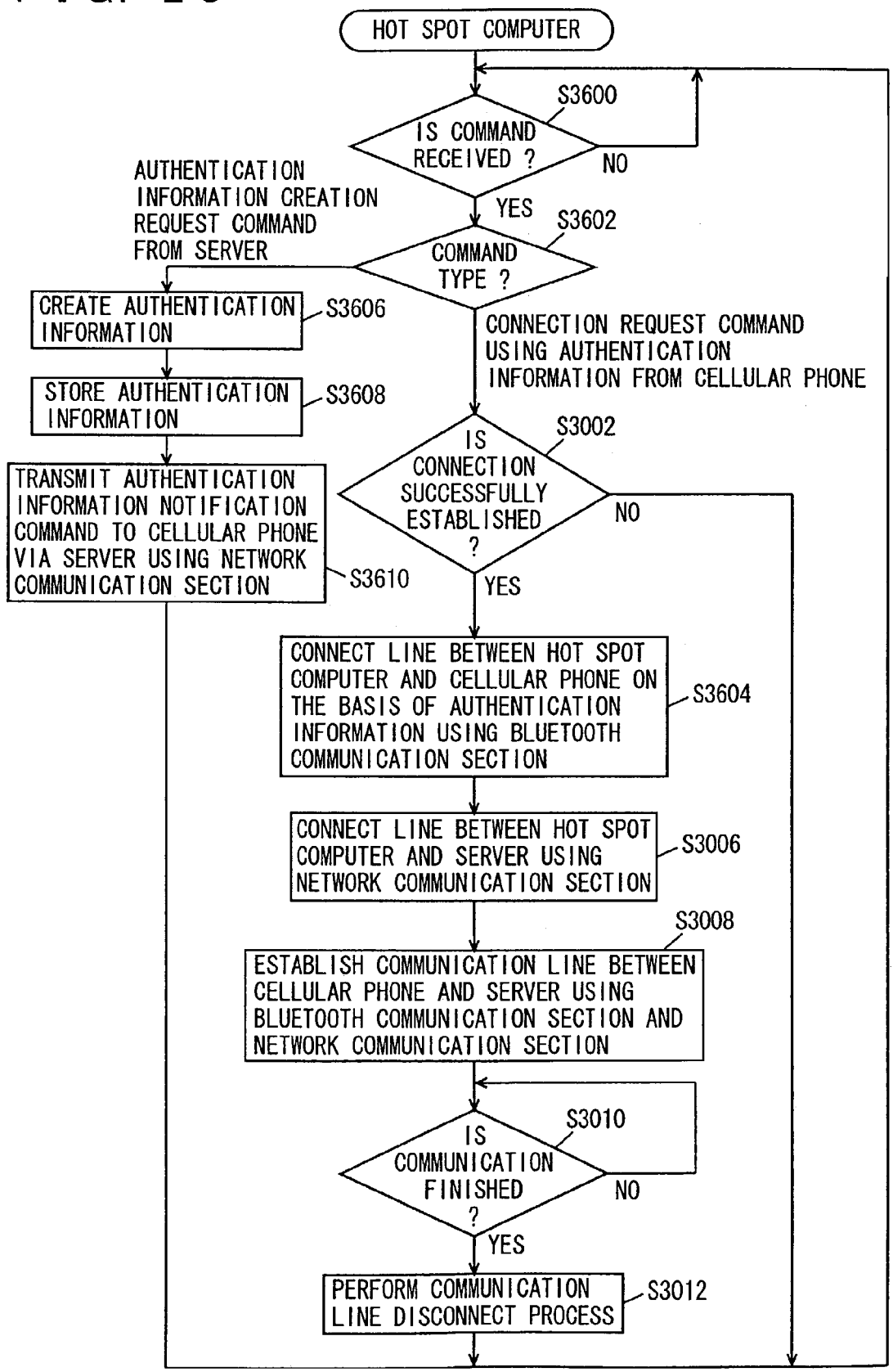
FIG. 29 is a flow chart for a process executed by a hot spot computer of the radio communication system according to the sixth embodiment of the present invention.

Referring to FIG. 29, description will be given of a control structure for a program executed by hot spot computer 300 of the radio communication system in this embodiment. It is noted that the same processes as those in the flow chart of FIG. 10 described above are respectively denoted by the same reference symbols in the flow chart of FIG. 29 and processes therefor are the same. Therefore, they will not be repeatedly described herein in detail.

In S3600, CPU 320 of hot spot computer 300 determines whether or not a command is received. When a command is received ("YES" in S3600), the processing proceeds to S3602. When a command is not received ("NO" in S3600), the processing returns to S3600 to wait for the reception of a command.

In S3602, CPU 320 determines the type of the command. When the received command is an authentication information creation request command from server 100, the processing proceeds to S3606. When the received command is a connection request command using the authentication information from cellular phone 200, the processing proceeds to S3002.

In S3604, CPU 320 connects the line between hot spot computer 300 and cellular phone 200 on the basis of the authentication information using Bluetooth communication section 326.

In S3606, CPU 320 creates authentication information. In S3608, CPU 320 stores the authentication information. In S3610, CPU 320 transmits the authentication information notification command to cellular phone 200 via server 100 using network communication section 328.

Description will be given of the operation of the radio communication system in this embodiment on the basis of the above-described structures and flow charts.

Server 100 transmits the authentication information creation request command to hot spot computer 300 using network communication section 128 (in S1600). When receiving the authentication information creation request command from server 100, hot spot computer 300 creates authentication information (in S3606), stores the authentication information (in S3608), and transmits the authentication information notification command to cellular phone 200 via server 100 using network communication section 328 (in S3610).

Cellular phone 200 receives the authentication information notification command from hot spot computer 300 via server 100 (in S2600). Information contained in the authentication information notification command is stored (in S2602), and cellular phone 200 connects the line between cellular phone 200 and hot spot computer 300 on the basis of the authentication information using Bluetooth communication section 250 (in S2604). At this moment, hot spot computer 300 connects the line between hot spot computer 300 and cellular phone 200 on the basis of the authentication information using Bluetooth communication section 326 (in S3604).

As can be seen, according to the radio communication system in the sixth embodiment, the hot spot computer creates authentication information. The hot spot computer transmits the created authentication information to the server. The server transmits the received authentication information to the cellular phone. The cellular phone authenticates the connection between the cellular phone and the hot spot computer on the basis of the authentication information received from the server, and the hot spot computer authenticates the connection between the cellular phone and the hot spot computer on the basis of the authentication information created by the hot spot computer. Thus, common authentication information is created by the hot spot computer and shared between the cellular phone and the hot spot computer. Due to this, it is unnecessary to store common authentication information in both the cellular phone and the hot spot computer in advance, and it is thereby possible to determine the authentication information according to various situations and to improve communication privacy.

Seventh Embodiment

Description will be given of a radio communication system according to a seventh embodiment. It is noted that the server, the cellular phone, and the hot spot computer of the radio communication system according to the seventh embodiment are equal in hardware configuration to those of the radio communication system according to the first embodiment. Therefore, they will not be repeatedly described herein in detail.

Figure 30:
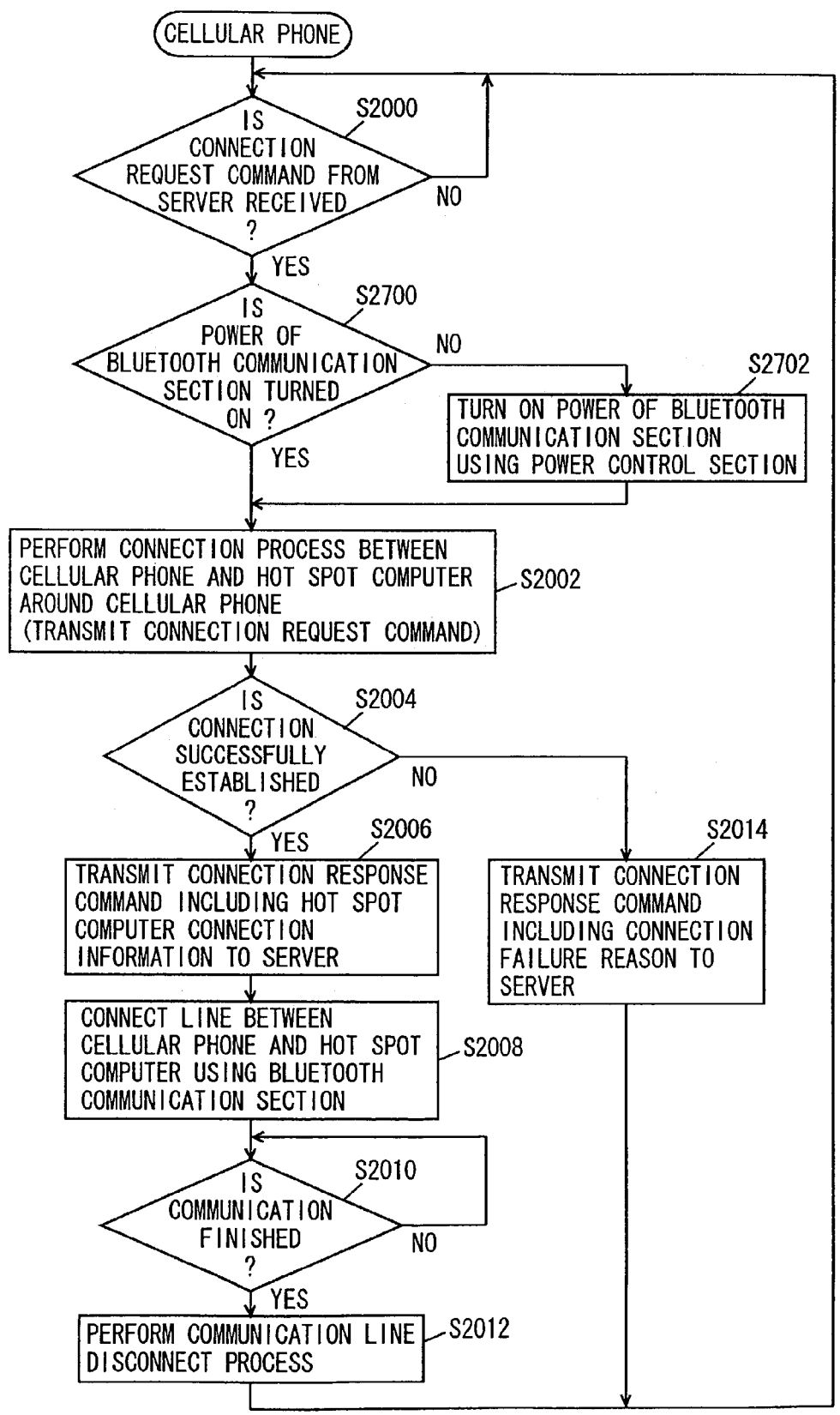
FIG. 30 is a flow chart for a process executed by a cellular phone of a radio communication system according to a seventh embodiment of the present invention.

Referring to FIG. 30, description will be given of a control structure for a program executed by cellular phone 200 of the radio communication system in this embodiment. It is noted that the same processes as those in the flow chart of FIG. 9 described above are respectively denoted by the same reference symbols in the flow chart of FIG. 30 and equal in processes therefor. Therefore, they will not be repeatedly described herein in detail.

In S2700, control section 220 of cellular phone 200 determines whether or not the power of Bluetooth communication section 250 is turned on. When the power of Bluetooth communication section 250 is turned on ("YES" in S2700), the processing proceeds to S2002. If not ("NO" in S2700), the processing proceeds to S2702.

In S2702, control section 220 turns on the power of Bluetooth communication section 250 using power control section 230. Thereafter, the processing proceeds to S2002.

Description will be given of the operation of cellular phone 200 of the radio communication system in this embodiment on the basis of the above-described structure and flow chart. When cellular phone 200 receives a connection request command from server 100 ("YES" in S2002), it is determined whether or not the power of Bluetooth communication section 250 is turned on (in S2700). When the power of Bluetooth communication section 250 is not turned on ("NO" in S2700), the power of Bluetooth communication section 250 is turned on using power control section 230 (in S2702).

As can be seen, according to the cellular phone of the radio communication system in the seventh embodiment, when the Bluetooth communication section does not operate, the power thereof is turned on to turn the Bluetooth communication section into an operating state, making it possible to execute a connection process between the cellular phone and the hot spot computer around the cellular phone. Since the power of the Bluetooth communication section is turned on only when it is necessary to do so, it is possible to decrease power consumption.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A radio communication system comprising:
a plurality of first communication devices;
a second communication device; and
a portable terminal holding radio communication with one of said first communication devices and said second communication device, wherein
said second communication device includes:

first communication means for communicating with one of said first communication devices;
second communication means for communicating with said portable terminal; and
third communication means for communicating with a communication device other than the communication device communicating with the first communication means; and
control means for controlling said first communication means, said second communication means and said third communication means,
said control means includes:
means for controlling said third communication means so as to receive a connection request to said portable terminal from said other communication device; and
means for controlling said second communication means so as to transmit said connection request to said portable terminal,
said portable terminal includes:
first communication means for communicating with said first communication device;
second communication means for communicating with said second communication device;
search means for searching for the communicable first communication device from said plurality of first communication devices in response to the connection request from said second communication device; and
control means for controlling said first communication means and said second communication means, said control means including means for controlling said first communication means and said second communication means so as to selectively execute one of a first communication mode for communicating with said other communication device via said second communication device and a second communication mode for communicating with said other communication device via said communicable first communication device and said second communication device on the basis of a search result of said search means,
said first communication device includes:
first communication means for communicating with said portable terminal;
second communication means for communicating with said second communication device; and
control means for controlling said first communication means and said second communication means,
said control means includes:
means for controlling said first communication means so as to transmit information representing that communication can be held, to said portable terminal in response to the search result of said search means; and
means for controlling said first communication means and said second communication means so as to hold communication between said portable terminal and said second communication device when said second communication mode is selected,
the control means of said portable terminal further includes means for controlling said first communication means and said second communication means so as to hold communication between said first communication device and said second communication device when said second communication mode is selected, and
the control means of said second communication means further includes:
means for controlling said second communication means and said third communication means so as to hold communication between said portable terminal and said other communication device when said first communication mode is selected; and
means for controlling said first communication means and said third communication means so as to hold communication between said first communication means and said other communication device when said second communication mode is selected.

2. The radio communication system according to claim 1, wherein
the control means of said portable terminal includes means for controlling said first communication means and said second communication means so as to selectively execute said second communication mode in response to the search result of said search means that the communicable first communication device is searched.

3. The radio communication system according to claim 1, wherein
the control means of said portable terminal includes means for controlling said first communication means and said second communication means so as to selectively execute said first communication mode in response to the search result of said search means that the communicable first communication means is not searched.

4. The radio communication system according to claim 3, wherein
the control means of said portable terminal further includes means for controlling said second communication means so as to execute said first communication mode and to transmit information representing a reason that the communicable first communication device is not searched by said search means to said second communication device, and
the control means of said second communication device further includes means for controlling said third communication means so as to transmit said information representing said reason to said other communication device.

5. The radio communication system according to claim 1, wherein
said second communication device further includes storage means for storing a communication history of the communication between said portable terminal and said first communication device, and
the control means of said second communication device further includes means for controlling said first communication means so as to communicate with the first communication device included in the communication history stored in said storage means on the basis of the communication history.

6. The radio communication system according to claim 1, wherein
said first communication device further includes storage means for storing a keyword and information corresponding to said keyword,
the control means of said second communication device further includes means for controlling said second communication means so as to transmit the keyword to said portable terminal,
the control means of said portable terminal further includes means for controlling said first communication means so as to transmit said keyword received from said second communication device to one of said first communication device,
said first communication device further includes read means for reading the information corresponding to said received keyword from said storage means in response to reception of said keyword from said portable terminal, and the control means of said first communication device further includes means for controlling said first communication means so as to transmit said corresponding information to said portable terminal.

7. The radio communication system according to claim 1, wherein
authentication for connection between said portable terminal and said first communication device is made using authentication information,
said second communication device further includes creation means for creating the authentication information,
the control means of said second communication device further includes:
means for controlling said first communication means so as to transmit said authentication information to said first communication device; and
means for controlling said second communication means so as to transmit said authentication information to said portable terminal,
the control means of said portable terminal further includes means for controlling said first communication means so as to communicate with said first communication device on the basis of the authentication information received from said second communication device, and
the control means of said first communication device further includes means for controlling said first communication means so as to communicate with said portable terminal on the basis of the authentication information received from said second communication means.

8. The radio communication system according to claim 1, wherein
authentication for connection between said portable terminal and said first communication device is made using authentication information,
said portable terminal further includes creation means for creating the authentication information,
the control means of said portable terminal further includes means for controlling said second communication means so as to transmit said authentication information to said second communication device,
the control means of said second communication device further includes means for controlling said first communication means so as to transmit said authentication information to said first communication device,
the control means of said portable terminal further includes means for controlling said first communication means so as to communicate with said first communication device on the basis of the authentication information created by said creation means, and
the control means of the first communication devices further includes means for controlling said first communication means so as to communicate with said portable terminal on the basis of the authentication information received from said second communication device.

9. The radio communication system according to claim 1, wherein
authentication for connection between said portable terminal and said first communication device is made using authentication information,
said first communication device further includes creation means for creating the authentication information,
the control means of said fist communication device further includes means for controlling said second communication means so as to transmit said authentication information to said second communication device,
the control means of said second communication device further includes means for controlling said second communication means so as to transmit said authentication information to said portable terminal,
the control means of said portable terminal further includes means for controlling said first communication means so as to communicate with said first communication device on the basis of the authentication information received from said second communication device, and
the control means of said first communication device further includes means for controlling said first communication means so as to communicate with said portable terminal on the basis of the authentication information created by said creation means.

10. The radio communication system according to claim 1, wherein
said portable terminal further includes switch means for switching a state of said first communication means to an operating state when said first communication means is in a non-operating state, in response to reception of the connection request from said second communication device.

11. A first communication device used in a radio communication system comprising: a plurality of first communication devices; a second communication device; and a portable terminal holding radio communication with one of said first communication devices and said second communication device, wherein
said second communication device receives a connection request from the other communication device to said portable terminal, and transmits the connection request to said portable terminal,
said portable terminal searches for the communicable first communication device from said plurality of first communication devices in response to reception of the connection request from said second communication device, and selectively executes a first communication mode for communicating with a communication device other than the communicable first communication device via said second communication device and a second communication mode for communicating with said other communication device via said communicable first communication device and said second communication device on the basis of a search result,
said first communication device includes:
first communication means for communicating with said portable terminal;
second communication means for communicating with said second communication device; and
control means for controlling said first communication means and said second communication means, and
said control means includes:
means for controlling said first communication means so as to transmit information representing that communication can be held, to said portable terminal in response to the fact that the communicable first communication device is searched by said portable terminal; and
means for controlling said first communication means and said second communication means to hold communication between said portable terminal and said second communication device when said second communication mode is selected.

12. The communication device according to claim 11, wherein
said first communication device further includes storage means for storing a keyword and information corresponding to said keyword,
said second communication device transmits the keyword to said portable terminal and said portable terminal transmits said received keyword to said first communication device,
said first communication device further includes read means for reading the information corresponding to said received keyword from said storage means in response to reception of said keyword from said portable terminal, and
said control means further includes means for controlling said first communication means to transmit said corresponding information to said portable terminal.

13. The communication device according to claim 11, wherein
authentication for connection between said portable terminal and said first communication device is made using authentication information,
said first communication device further includes creation means for creating the authentication information,
said control means further includes means for controlling said second communication means to transmit said authentication information to said second communication device,
said second communication device transmits said authentication information to said portable terminal, and
said control means further includes means for controlling said first communication means to communicate with said portable terminal on the basis of the authentication information created by said creation means.

14. A second communication device used in a radio communication system, the radio communication system comprising: a plurality of first communication devices; the second communication device; and a portable terminal holding radio communication with one of said first communication devices and said second communication device, wherein
said portable terminal searches for the communicable first communication device from said plurality of first communication devices in response to reception of a communication request from said second communication device, and selectively executes a first communication mode for communicating with a communication device other than the communicable first communication device via said second communication device and a second communication mode for communicating with said other communication device via said communicable first communication device and said second communication device on the basis of a search result,
said first communication device transmits information representing that communication can be held to said portable terminal in response to the fact that the communicable first communication device is searched by said portable terminal, to said portable terminal,
said second communication device includes:
first communication means for communicating with said first communication device;
second communication means for communicating with said portable terminal;
third communication means for communicating with the other communication device; and
control means for controlling said first communication means, said second communication means, and said third communication means,
said control means includes:
means for controlling said third communication means to receive a connection request to said portable terminal from said other communication device;
means for controlling said second communication means to transmit said connection request to said portable terminal;
means for controlling said second communication means and said third communication means to hold communication between said portable terminal and said other communication device when said first communication mode is selected; and
means for controlling said first control means and said third communication means to hold communication between said first communication device and said other communication device when said second communication mode is selected.

15. The communication device according to claim 14, wherein
said second communication device further includes storage means for storing a communication history for communication between said portable terminal and said one communication device, and
said control means further includes means for controlling said first communication means to communicate with the first communication device included in the communication history stored in said storage means on the basis of said communication history.

16. The communication device according to claim 14, wherein
authentication for connection between said portable terminal and said first communication device is made using authentication information,
said second communication device further includes creation means for creating the authentication information, and
said control means further includes:
means for controlling said first communication means to transmit said authentication information to said first communication device; and
means for controlling said second communication means to transmit said authentication information to said portable terminal.

17. A portable terminal used in a radio communication system, the radio communication system comprising: a plurality of communication devices; a second communication device; and the portable device holding radio communication with one of said first communication devices and said second communication device, wherein
said second communication device receives a connection request from a communication device other than said second communication device to said portable terminal, and transmits said received connection request to said portable terminal,
said portable terminal includes:
first communication means for communicating with said first communication device;
second communication means for communicating with said second communication device;
search means for searching for the communicable first communication device from said plurality of first communication devices in response to reception of the connection request from said second communication device; and control means for controlling said first communication means and said second communication means, said control means includes:

means for controlling said first communication means and said second communication means to selectively execute a first communication mode for communicating with said other communication device via said second communication device and a second communication mode for communicating said other communication device via said communicable first communication device and said second communication device on the basis of a search result of said search means; and means for controlling said first communication means and said second communication means to hold communication between said first communication device and said second communication device when said second communication mode is selected.

18. The portable terminal according to claim 17, wherein said control means includes means for controlling said first communication means and said second communication means to hold the communication between said first communication device and said second communication device when said second communication mode is selected.

19. The portable terminal according to claim 17, wherein said control means includes means for controlling said first communication means and said second communication means to selectively execute said first communication mode in response to the fact that no communicable first communication device is searched by said search means.

20. The portable terminal according to claim 19, wherein said control means further includes means for controlling said second communication means to execute said first communication mode and to transmit information representing a reason that no communicable first communication device is searched by said search means, to said second communication device.

21. The portable terminal according to claim 17, wherein authentication for connection between said portable terminal and said first communication device is made using authentication information, said portable terminal further includes creation means for creating the authentication information, said control means further includes means for controlling said second communication means to transmit said authentication information to said second communication device, and said second communication device transmits said authentication information to said first communication device.

22. The portable terminal according to claim 17, wherein said portable terminal further includes switch means for switching a state of said first communication means to an operating state when said first communication means is in a non-operating state, in response to reception of the communication request from said second communication device.

23. A communication method for a first communication device used in a radio communication system, the radio communication system comprising: a plurality of first communication devices; a second communication device; and a portable terminal holding radio communication with one of said first communication devices and said second communication device, wherein said second communication device receives a connection request from the other communication device to said portable terminal, and transmits the connection request to said portable terminal, said portable terminal searches for the communicable first communication device from said plurality of first communication devices in response to reception of the connection request from said second communication device, and selectively executes a first communication mode for communicating with a communication device other than the communicable first communication device via said second communication device and a second communication mode for communicating with said other communication device via said communicable first communication device and said second communication device on the basis of a search result, said communication method comprises the steps of:

communicating with said portable terminal;

communicating with said second communication device; and controlling the step of communicating with said portable terminal and the step of communicating with said second communication device, and the step of controlling said communication steps includes:

controlling the step of communicating with said portable terminal to transmit information representing that communication can be held, to said portable terminal in response to the fact that the communicable first communication device is searched by said portable terminal; and controlling the step of communicating with said portable terminal and the step of communicating with said second communication device to hold communication between said portable terminal and said second communication device when said second communication mode is selected.

24. A recording medium recording a program for realizing the communication method according to claim 23 using a computer.

25. A communication method for a second communication device used in a radio communication system, the radio communication system comprising: a plurality of first communication devices; the second communication device; and a portable terminal holding radio communication with one of said first communication devices and said second communication device, wherein said portable terminal searches for the communicable first communication device from said plurality of first communication devices in response to reception of a communication request from said second communication device, and selectively executes a first communication mode for communicating with a communication device other than the communicable first communication device via said second communication device and a second communication mode for communicating with said other communication device via said communicable first communication device and said second communication device on the basis of a search result, said first communication device transmits information representing that communication can be held to said portable terminal in response to the fact that the communicable first communication device is searched by said portable terminal, to said portable terminal, said communication method comprises the steps of:

communicating with said first communication device;

communicating with said portable terminal;

communicating with the other communication device; and controlling the step of communicating with said first communication device, the step of communicating with said portable terminal, and the step of communicating with the other communication device, the step of controlling said communication steps includes the steps of:

controlling the step of communicating with said other communication device to receive a connection request to said portable terminal from said other communication device;

controlling the step of communicating with said portable terminal to transmit said connection request to said portable terminal;

controlling the step of communicating with said portable terminal and the step of communicating with the other communication device to hold communication between said portable terminal and said other communication device when said first communication mode is selected; and controlling the step of communicating with said first communication device and the step of communicating with the other device to hold communication between said first communication device and said other communication device when said second communication mode is selected.

26. A recording medium recording a program for realizing the communication method according to claim 25 using a computer.

27. A communication method for a portable terminal used in a radio communication system, the radio communication system comprising: a plurality of communication devices; a second communication device; and the portable device holding radio communication with one of said first communication devices and said second communication device, wherein said portable device receives a connection request from a communication device other than said second communication device to said portable terminal, and transmits said received connection request to said portable terminal, said communication method comprises the steps of:

communicating with said first communication device;

communicating with said second communication device;

searching for the communicable first communication device from said plurality of first communication devices in response to reception of the connection request from said second communication device; and controlling the step of communicating with said first communication device and the step of communicating with said second communication device, and the step of controlling said communication steps includes the steps of:

controlling the step of communicating with said first communication device and the step of communicating with said second communication device to selectively execute a first communication mode for communicating with said other communication device via said second communication device and a second communication mode for communicating said other communication device via said communicable first communication device and said second communication device on the basis of a search result of the step of searching for said communicable first communication device; and controlling the step of communicating with said first communication device and the step of communicating with said second communication device to hold communication between said first communication device and said second communication device when said second communication mode is selected.

28. A recording medium recording a program for realizing the communication method according to claim 27 using a computer.

* * * * *